United States Patent
Kim et al.

(10) Patent No.: US 9,088,471 B1
(45) Date of Patent: Jul. 21, 2015

(54) QUADRATURE COMBINING AND ADJUSTING

(71) Applicant: QUALCOMM Incorporated, San Diego, CA (US)

(72) Inventors: Hong Sun Kim, San Jose, CA (US); James Ian Jaffee, Solana Beach, CA (US); Paul Sheehy, San Diego, CA (US); Jeremy Darren Dunworth, San Diego, CA (US); Cheng-Han Wang, San Jose, CA (US); Prasad Srinivasa Siva Gudem, San Diego, CA (US); Ojas Mahendra Choksi, San Diego, CA (US); Jungdong Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/465,442

(22) Filed: Aug. 21, 2014

Related U.S. Application Data

(60) Provisional application No. 61/941,908, filed on Feb. 19, 2014.

(51) Int. Cl.
*H04L 5/12* (2006.01)
*H04L 27/36* (2006.01)
(Continued)

(52) U.S. Cl.
CPC .......... *H04L 27/362* (2013.01); *H04L 27/2601* (2013.01); *H04L 2027/0016* (2013.01)

(58) Field of Classification Search
CPC ............................................ H04L 2027/0016
USPC ....................................................... 375/355
See application file for complete search history.

(56) References Cited

U.S. PATENT DOCUMENTS

| 6,061,551 | A | 5/2000 | Sorrells et al. |
| 6,091,940 | A | 7/2000 | Sorrells et al. |

(Continued)

FOREIGN PATENT DOCUMENTS

| EP | 2434640 A1 | 3/2012 |
| WO | WO-0237787 A1 | 5/2002 |

(Continued)

OTHER PUBLICATIONS

Couch II L.W, "Modern Communication Systems—Principles and Applications", Prentice Hall, Englewood Cliffs, New Jersey, 1995, 632 Pages.

(Continued)

*Primary Examiner* — Santiago Garcia
(74) *Attorney, Agent, or Firm* — Patterson & Sheridan, L.L.P.

(57) ABSTRACT

Certain aspects of the present disclosure provide methods and apparatus for performing quadrature combining and adjusting. One example circuit may include first through fourth mixing circuits. The first mixing circuit may multiply a radio frequency signal with a first local oscillating signal to generate a first frequency converted signal. The second mixing circuit may multiply a radio frequency (RF) signal with a second local oscillating signal, which may be about 90° out of phase with the first local oscillating signal, to generate a second frequency converted signal. The third and fourth mixing circuits may multiply the RF signal with the second and first signals, respectively, to generate third and fourth frequency converted signals, respectively. A first combining circuit may combine the first and third frequency converted signals, and a second combining circuit may combine the second and fourth frequency converted signals.

36 Claims, 20 Drawing Sheets

(51) Int. Cl.
*H04L 27/26* (2006.01)
*H04L 27/00* (2006.01)

(56) References Cited

U.S. PATENT DOCUMENTS

| | | | |
|---|---|---|---|
| 6,230,000 B1 | 5/2001 | Tayloe | |
| 6,266,518 B1 | 7/2001 | Sorrells et al. | |
| 6,330,290 B1 | 12/2001 | Glas | |
| 6,370,371 B1 | 4/2002 | Sorrells et al. | |
| 6,580,902 B1 | 6/2003 | Sorrells et al. | |
| 6,704,549 B1 | 3/2004 | Sorrells et al. | |
| 6,873,836 B1 | 3/2005 | Sorrells et al. | |
| 6,960,962 B2 | 11/2005 | Peterzell et al. | |
| 6,963,734 B2 | 11/2005 | Sorrells et al. | |
| 7,039,372 B1 | 5/2006 | Sorrells et al. | |
| 7,050,508 B2 | 5/2006 | Sorrells et al. | |
| 7,194,246 B2 | 3/2007 | Sorrells et al. | |
| 7,218,907 B2 | 5/2007 | Sorrells et al. | |
| 7,496,342 B2 | 2/2009 | Sorrells et al. | |
| 7,515,896 B1 | 4/2009 | Sorrells et al. | |
| 7,724,845 B2 | 5/2010 | Sorrells et al. | |
| 7,769,361 B2 | 8/2010 | Zhuo et al. | |
| 7,822,401 B2 | 10/2010 | Sorrells et al. | |
| 7,826,816 B2 | 11/2010 | Zhuo et al. | |
| 7,856,050 B1 | 12/2010 | Wiss et al. | |
| 7,865,177 B2 | 1/2011 | Sorrells et al. | |
| 8,072,255 B2 | 12/2011 | Cicalini | |
| 8,085,877 B2* | 12/2011 | Rofougaran | 375/324 |
| 8,126,036 B2* | 2/2012 | Koren et al. | 375/219 |
| 8,160,529 B1 | 4/2012 | Clement et al. | |
| 8,190,116 B2 | 5/2012 | Sorrells et al. | |
| 8,379,698 B2* | 2/2013 | Murray et al. | 375/219 |
| 2005/0107059 A1* | 5/2005 | Lehning et al. | 455/303 |
| 2007/0189417 A1* | 8/2007 | Waheed et al. | 375/300 |
| 2007/0197183 A1 | 8/2007 | Guruswami | |
| 2008/0181337 A1* | 7/2008 | Maxim | 375/340 |
| 2008/0212662 A1* | 9/2008 | Lee et al. | 375/224 |
| 2009/0086851 A1* | 4/2009 | Rofougaran | 375/324 |
| 2010/0041359 A1* | 2/2010 | Liu et al. | 455/311 |
| 2011/0182335 A1* | 7/2011 | Pratt et al. | 375/224 |
| 2013/0130632 A1 | 5/2013 | Oishi | |
| 2013/0208827 A1 | 8/2013 | Muhammad et al. | |
| 2013/0243048 A1* | 9/2013 | Zhu et al. | 375/219 |
| 2013/0336143 A1* | 12/2013 | Choksi et al. | 370/252 |
| 2014/0029700 A1* | 1/2014 | Viswanathan | 375/324 |
| 2014/0098913 A1 | 4/2014 | Fernandes et al. | |

FOREIGN PATENT DOCUMENTS

| | | |
|---|---|---|
| WO | WO-2008003061 A2 | 1/2008 |
| WO | WO-2010124298 A2 | 10/2010 |

OTHER PUBLICATIONS

Crols J., "Full Integration of Wireless Transceiver Systems", 17B—Communication systems, telecommunications, U-Thesis, 1997, pp. 1-234.

Lee T.H, "The Design of CMOS Radio-Frequency Integrated Circuits", Cambridge University Press, 1998, 618 Pages.

Shahani A. R., et al., "SP 22.3: A 12mW Wide Dynamic Range CMOS Front-End for a Portable GPS Receiver", IEEE International Solid-state Circuits Conference, IEEE, 1997, Digest of Technical Papers, pp. 368-369, 487.

Shahani A.R., et al., "A 12-mW wide dynamic range CMOS front-end for a portable GPS receiver," IEEE Journal of Solid-State Circuits, Dec. 1997, vol. 32 (12), pp. 2061-2070.

Soer M., "Analysis and Comparison of Switch-Based Frequency Converters", Faculty of Electrical Engineering, Mathematics & Computer Science, University of Twente, Master Thesis, 2007, pp. 1-69.

Van Graas D.H., "The Fourth Method: Generating and Detecting SSB Signals," QEX, Sep. 1990, pp. 7-11.

International Search Report and Written Opinion—PCT/US2015/014265—ISA/EPO—Apr. 28, 2015.

Nozawa Y, "The Merigo Method: SSB Generator/ Producing a Demodulator", HAM Journal, 1993, 27 pages.

* cited by examiner $$PCIO = \cos(\omega\, t)\left(1 - \frac{\alpha^2}{4}\right)\cos\left(\frac{\Delta}{2}\right)$$

$$PCQO = \sin(\omega\, t)\left(1 - \frac{\alpha^2}{4}\right)\cos\left(\frac{\Delta}{2}\right)$$

QUADRATURE COMBINING AND ADJUSTING

CLAIM OF PRIORITY UNDER 35 U.S.C. §119

This application claims benefit of U.S. Provisional Patent Application Ser. No. 61/941,908, filed Feb. 19, 2014 and entitled "Methods and Apparatus for Quadrature Combining and Adjusting," which is herein incorporated by reference in its entirety.

TECHNICAL FIELD

Certain aspects of the present disclosure generally relate to radio frequency (RF) electronic circuits and, more particularly, to quadrature combining and adjusting.

BACKGROUND

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1 xRTT (1 times Radio Transmission Technology, or simply 1x), W-CDMA (Wideband Code Division Multiple Access), UMTS-TDD (Universal Mobile Telecommunications System-Time Division Duplexing), HSPA (High Speed Packet Access), GPRS (General Packet Radio Service), or EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems. Such multiple access networks may also include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, 3rd Generation Partnership Project (3GPP) Long Term Evolution (LTE) networks, and Long Term Evolution Advanced (LTE-A) networks.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

SUMMARY

Certain aspects of the present disclosure generally relate to quadrature combining and adjusting in radio frequency (RF) circuits. Signals that are 90° (or nearly) 90° out of phase with respect to each other are often referred to as being "in quadrature."

Certain aspects of the present disclosure provide a circuit for frequency converting and quadrature combining. The circuit generally includes a first mixing circuit configured to multiply a radio frequency (RF) signal with a first local oscillating signal to generate a first frequency converted signal; a second mixing circuit configured to multiply the RF signal with a second local oscillating signal to generate a second frequency converted signal, wherein the second local oscillating signal is about 90° out of phase with respect to the first local oscillating signal; a third mixing circuit configured to multiply the RF signal with the second local oscillating signal to generate a third frequency converted signal; a fourth mixing circuit configured to multiply the RF signal with the first local oscillating signal to generate a fourth frequency converted signal; a first combining circuit configured to combine the first frequency converted signal with the third frequency converted signal; and a second combining circuit configured to combine the second frequency converted signal with the fourth frequency converted signal.

According to certain aspects, the circuit further includes a first scaling circuit interposed between the third mixing circuit and the first combining circuit and configured to scale the third frequency converted signal to have an amplitude that is a fraction of the first frequency converted signal; and a second scaling circuit interposed between the fourth mixing circuit and the second combining circuit and configured to scale the fourth frequency converted signal to have an amplitude that is a fraction of the second frequency converted signal. In this case, a gain of at least one of the first or second scaling circuits may be programmable. At least one of the first or second scaling circuits may be configured to invert a phase of the third or fourth frequency converted signal, respectively. The phase inversion of the at least one of the first or second scaling circuits may be programmable.

According to certain aspects, the first and second combining circuits comprise summing nodes for current summing respective signals.

According to certain aspects, at least one of the third and fourth mixing circuits are programmable.

According to certain aspects, the first and second local oscillating signals and the first, second, third, and fourth frequency converted signals are differential signals. In this case, the RF signal may be a differential signal.

According to certain aspects, the RF signal may be received from a transconductance amplifier.

According to certain aspects, a phase imbalance between at least one of the first and second oscillating signals or the first and second mixing circuits may be corrected or at least adjusted at outputs of the first and second combining circuits.

According to certain aspects, the circuit further includes a first baseband circuit for processing a combination of the first and third frequency converted signals and a second baseband circuit for processing a combination of the second and fourth frequency converted signals. In this manner, a phase imbalance between the first and second baseband circuits may have been corrected or at least adjusted at outputs of the first and second combining circuits.

Certain aspects of the present disclosure provide a method for frequency converting and quadrature combining. The method generally includes multiplying an RF signal with a first local oscillating signal to generate a first frequency converted signal; multiplying the RF signal with a second local oscillating signal to generate a second frequency converted signal, wherein the second local oscillating signal is about 90° out of phase with respect to the first local oscillating signal; multiplying the RF signal with the second local oscillating signal to generate a third frequency converted signal; multiplying the RF signal with the first local oscillating signal to generate a fourth frequency converted signal; combining the first and third frequency converted signals; and combining the second and fourth frequency converted signals.

Certain aspects of the present disclosure provide an apparatus for frequency converting and quadrature combining. The apparatus generally includes means for multiplying an RF signal with a first local oscillating signal to generate a first frequency converted signal; means for multiplying the RF signal with a second local oscillating signal to generate a second frequency converted signal, wherein the second local oscillating signal is about 90° out of phase with respect to the first local oscillating signal; means for multiplying the RF signal with the second local oscillating signal to generate a third frequency converted signal; means for multiplying the RF signal with the first local oscillating signal to generate a fourth frequency converted signal; means for combining the first and third frequency converted signals; and means for combining the second and fourth frequency converted signals.

Certain aspects of the present disclosure provide a circuit for frequency converting and quadrature combining. The circuit generally includes a first mixing circuit configured to multiply an RF signal with a first local oscillating signal to generate a first frequency converted signal; a second mixing circuit configured to multiply the RF signal with a second local oscillating signal to generate a second frequency converted signal, wherein the second local oscillating signal is about 90° out of phase with respect to the first local oscillating signal; a first combining circuit configured to combine the first frequency converted signal with a portion of the second frequency converted signal; and a second combining circuit configured to combine the second frequency converted signal with a portion of the first frequency converted signal.

According to certain aspects, the circuit may further include at least one of: (1) a first scaling circuit interposed between the second mixing circuit and the first combining circuit and configured to scale the portion of the second frequency converted signal to have an amplitude that is a fraction that of the first frequency converted signal; or (2) a second scaling circuit interposed between the first mixing circuit and the second combining circuit and configured to scale the portion of the first frequency converted signal to have an amplitude that is a fraction that of the second frequency converted signal. In this case, a gain of at least one of the first or second scaling circuit may be programmable. At least one of the first or second scaling circuit may be configured to invert a phase of the portion of the second or first frequency converted signal, respectively. The phase inversion of the at least one of the first or second scaling circuit may be programmable. For certain aspects, the at least one of the first or second scaling circuit may be selectively enabled by at least one of the first or second local oscillating signal.

According to certain aspects, the first and second combining circuits comprise summing nodes for current summing respective signals.

According to certain aspects, the first and second local oscillating signals and the first and second frequency converted signals are differential signals. The RF signal may be a single-ended or a differential signal.

According to certain aspects, the RF signal may be received from a transconductance amplifier.

According to certain aspects, a phase imbalance between at least one of the first and second local oscillating signals or the first and second mixing circuits may be corrected or at least adjusted at outputs of the first and second combining circuits.

According to certain aspects, the circuit further includes a first baseband circuit configured to process a combination of the first frequency converted signal and the portion of the second frequency converted signal and a second baseband circuit configured to process a combination of the second frequency converted signal and the portion of the first frequency converted signal. In this manner, a phase imbalance between the first and second baseband circuits may have been corrected or at least adjusted at the combination of the first and the portion of the second frequency converted signals and at the combination of the second and the portion of the first frequency converted signals.

Certain aspects of the present disclosure provide a method for frequency converting and quadrature combining. The method generally includes multiplying an RF signal with a first local oscillating signal to generate a first frequency converted signal; multiplying the RF signal with a second local oscillating signal to generate a second frequency converted signal, wherein the second local oscillating signal is about 90° out of phase with respect to the first local oscillating signal; combining the first frequency converted signal with a portion of the second frequency converted signal; and combining the second frequency converted signal with a portion of the second frequency converted signal.

Certain aspects of the present disclosure provide an apparatus for frequency converting and quadrature combining. The apparatus generally includes means for multiplying an RF signal with a first local oscillating signal to generate a first frequency converted signal; means for multiplying the RF signal with a second local oscillating signal to generate a second frequency converted signal, wherein the second local oscillating signal is about 90° out of phase with respect to the first local oscillating signal; means for combining the first frequency converted signal with a portion of the second frequency converted signal; and means for combining the second frequency converted signal with a portion of the second frequency converted signal.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and the like. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11 (Wireless Local Area Network (WLAN)), IEEE 802.16 (Worldwide Interoperability for Microwave Access (WiMAX)), Long Term Evolution (LTE) (e.g., in TDD and/or FDD modes), or some other standards. A TDMA system may implement Global System for Mobile Communications (GSM) or some other standards. These various standards are known in the art. The techniques described herein may also be implemented in any of various other suitable wireless systems using radio frequency (RF) technology, including Global Navigation Satellite System (GNSS), Bluetooth, IEEE 802.15 (Wireless Personal Area Network (WPAN)), Near Field Communication (NFC), Small Cell, Frequency Modulation (FM), and the like.

An Example Wireless System

Figure 1:
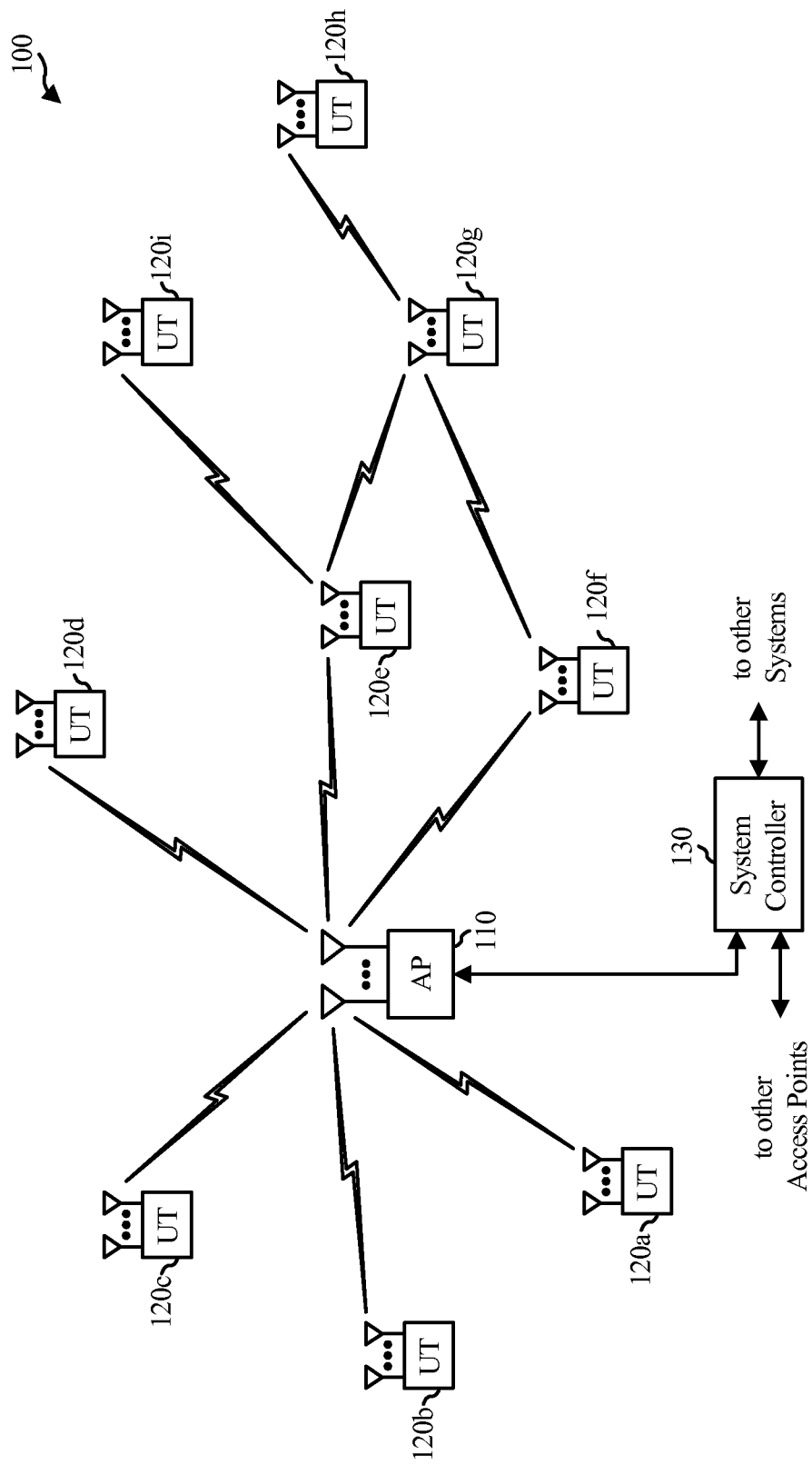
FIG. 1 illustrates an example wireless communications network in accordance with certain aspects of the present disclosure.

FIG. 1 illustrates a wireless communications system 100 with access points and user terminals. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink may share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
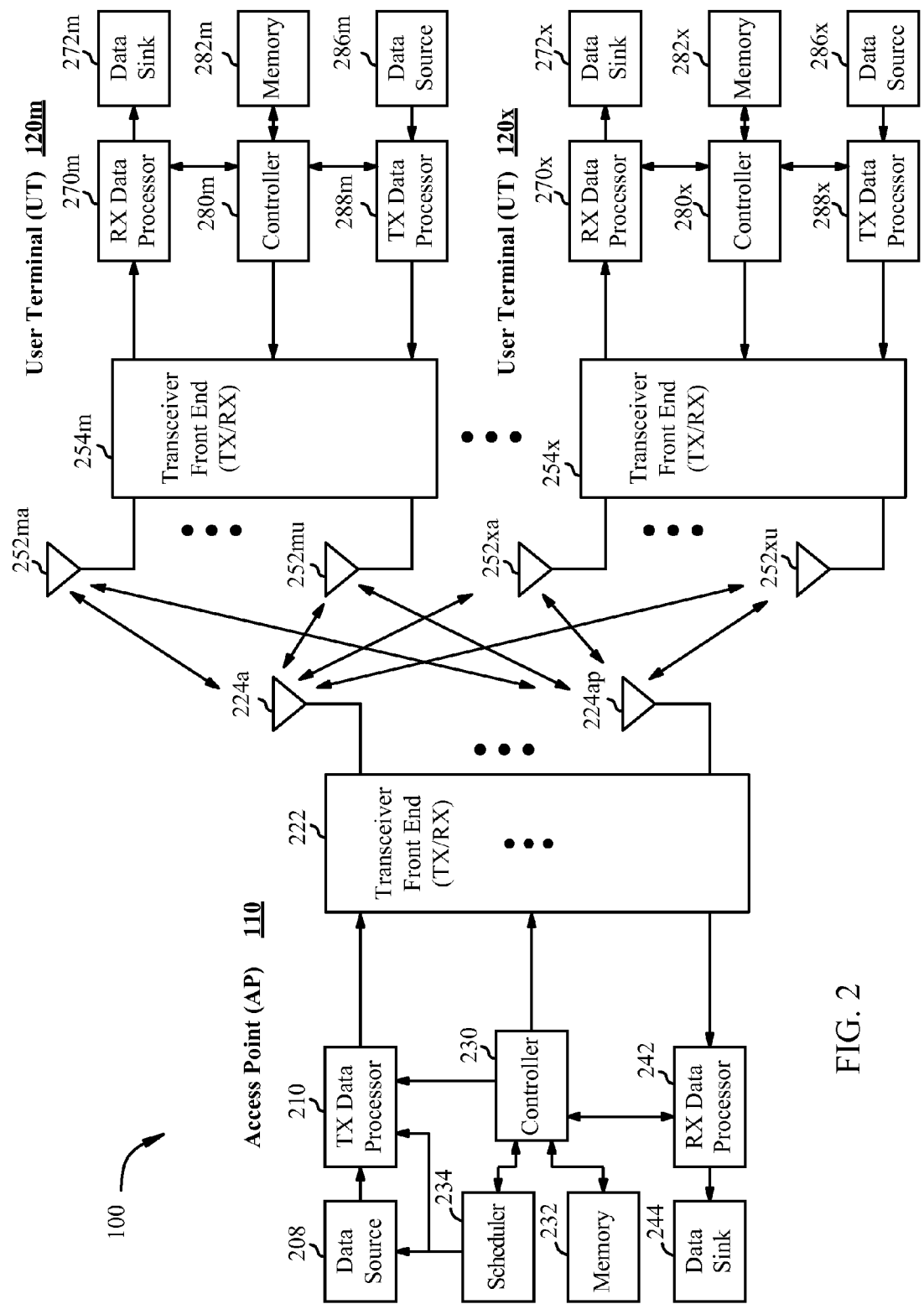
FIG. 2 is a block diagram of an example access point (AP) and user terminals in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, a combination of the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222.

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, a combination of the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, and combinations thereof.

Figure 3:
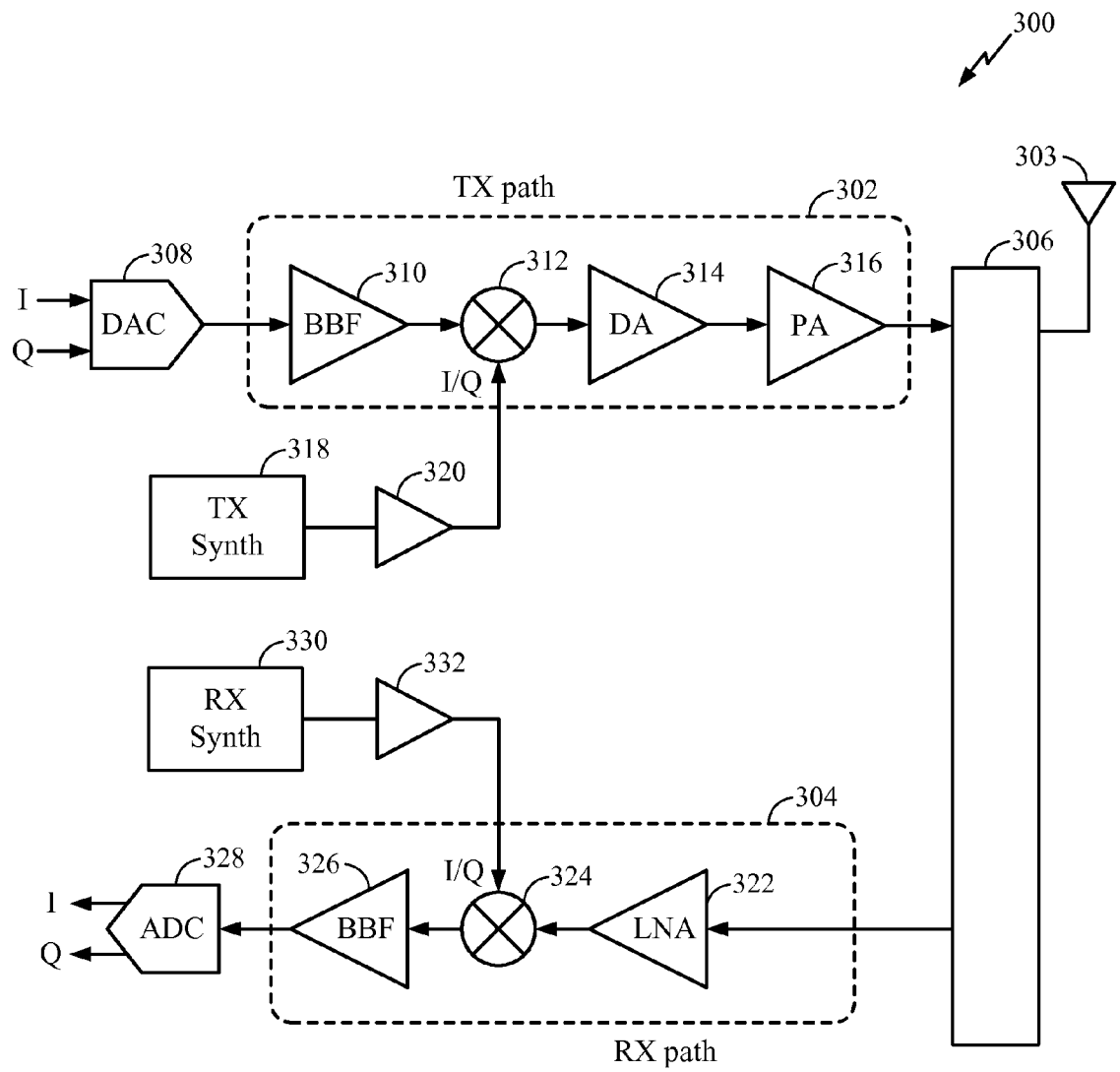
FIG. 3 is a block diagram of an example transceiver front end in accordance with certain aspects of the present disclosure.

FIG. 3 is a block diagram of an example transceiver front end 300, such as transceiver front ends 222, 254 in FIG. 2, in accordance with certain aspects of the present disclosure. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier 316. The BBF 310, the mixer 312, and the DA 314 may be included in a radio frequency integrated circuit (RFIC), while the PA 316 is often external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which are amplified by the DA 314 and by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies indicates using a variable-frequency oscillator, which involves compromises between stability and tunability. Contemporary systems employ frequency synthesizers with a voltage-controlled oscillator (VCO) to generate a stable, tunable LO with a particular tuning range. Thus, the transmit LO is typically produced by a TX frequency synthesizer 318, which may be buffered or amplified by amplifier 320 before being mixed with the baseband signals in the mixer 312. Similarly, the receive LO is typically produced by an RX frequency synthesizer 330, which may be buffered or amplified by amplifier 332 before being mixed with the RF signals in the mixer 324. The transmit LO (and/or the receive LO) may be generated, for example, by frequency dividing the VCO signal by an integer value or by using an LO generating circuit which translates the VCO frequency to the LO frequency. Example LO generating circuits may be found in U.S. Pat. No. 6,960,962 to Peterzell et al., filed Dec. 10, 2001 and entitled "Local Oscillator Leakage Control in Direct Conversion Processes," which is herein incorporated by reference in its entirety. Although not shown in FIG. 3, a person having ordinary skill in the art will understand that the transmit LO (or receive LO) frequency dividing or generating circuit occurs inside the TX frequency synthesizer 318 (or RX frequency synthesizer 330).

Example Quadrature Combining and Adjusting

Figure 4A:
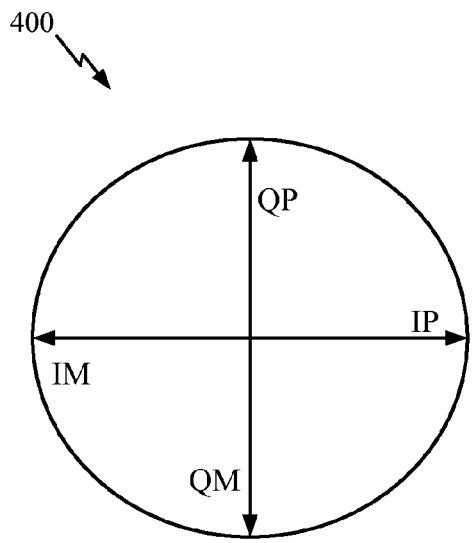
FIGS. 4A-4D illustrate respectively no phase imbalance between quadrature signals, a phase imbalance between quadrature signals, simplex phase correction on quadrature signals, and duplex phase correction on quadrature signals, in accordance with certain aspects of the present disclosure.

Wireless communication systems transmitting radio frequency (RF) signals typically utilize in-phase (I) and quadrature (Q) components, where the Q component is approximately 90° out of phase with the I component. Ideally, there would be no phase mismatch between the I and Q components, such that the Q component is exactly 90° out of phase with the I component. This ideal situation is illustrated in the vector diagram 400 of FIG. 4A, where "P" and "M" represent the positive and negative differential signals. Thus, vector QP represents the gain and phase of the +Q signal of a differential Q signal, while vector QM represents the gain and phase of the −Q signal. Likewise, vector IP represents the gain and phase of the +I signal of a differential I signal, while vector IM represents the gain and phase of the −I signal.

Figure 4B:
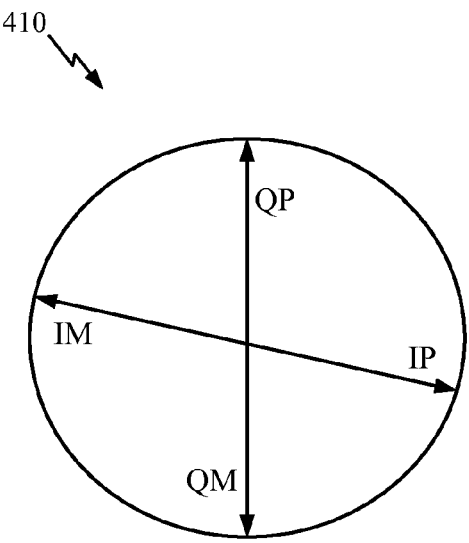

Typically, however, there is some phase imbalance (more or less than the ideal 90°) between the I and Q components as illustrated in the vector diagram 410 of FIG. 4B, such that there is increased residual sideband (RSB) (i.e., the image rejection suffers). Such phase imbalance is very common in real-world RF circuits and occurs when the circuit components (e.g., transistors, resistors, and capacitors) are not perfectly matched between I and Q paths.

Figure 4C:
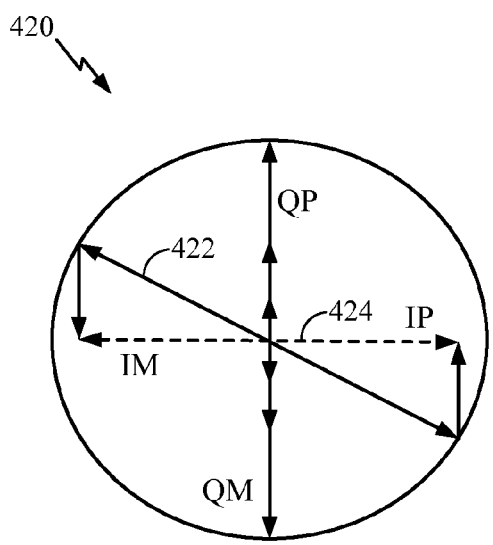

In an attempt to remove the RSB phase error, either the I or Q local oscillator (LO) and/or baseband (BB) may be phase shifted (e.g., by introducing an intentional delay into the I or Q baseband signal generated by the mixers) in a simplex phase imbalance correction, as illustrated in the vector diagram 420 of FIG. 4C where the IP/IM signals, for example, are adjusted from the solid line 422 to the dotted line 424. However, this simplex correction may introduce an amplitude error, as illustrated by the dotted line 424, where the adjusted IP/IM signals have a smaller amplitude than the QP/QM signals.

Accordingly, what is needed are techniques and apparatus for improved RSB phase error calibration that does not introduce an amplitude error.

Phase Adjustment Using Auxiliary Mixers

Certain aspects of the present disclosure perform phase imbalance adjustment at outputs of the I and Q mixers in the RFFE of a wireless communication device in an effort to correct the phase imbalance at the baseband (BB) I and Q components. For certain aspects, this adjustment may be performed using auxiliary mixers in conjunction with the conventional I and Q mixers.

Figure 4D:
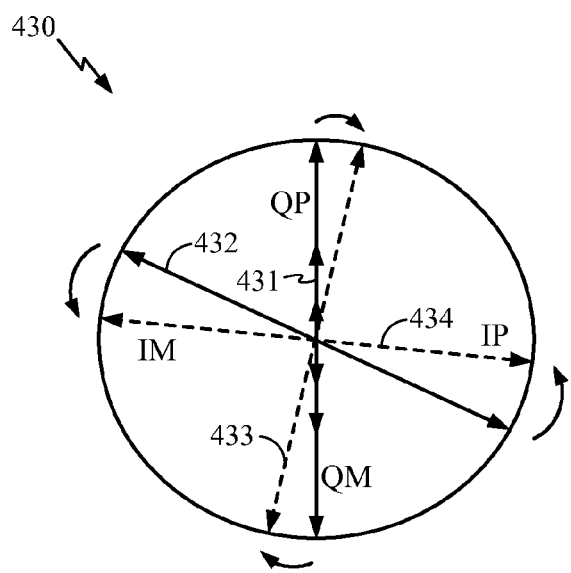
Figure 5:
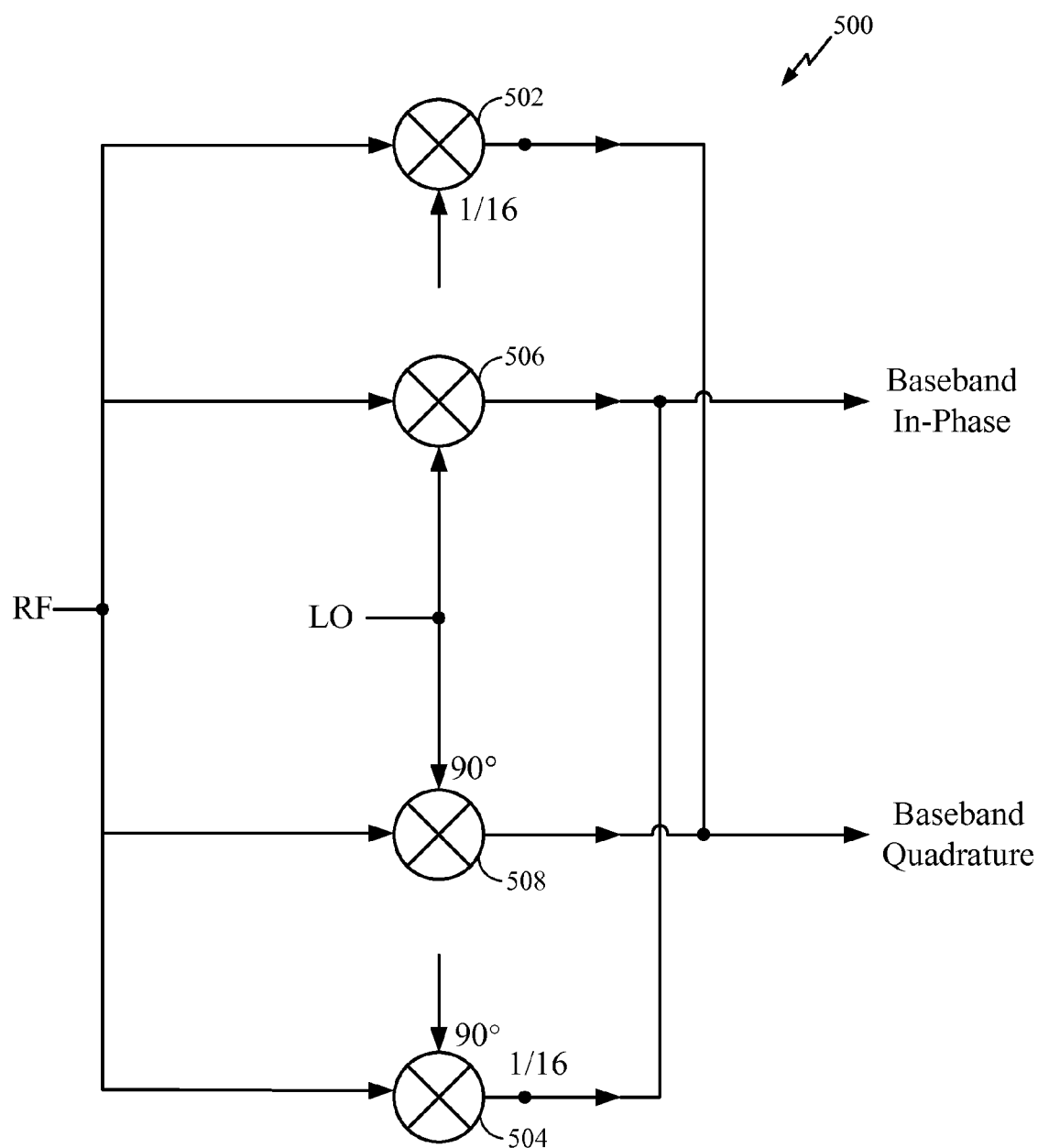
FIG. 5 illustrates an example conceptual phase imbalance adjusting circuit using auxiliary mixers, in accordance with certain aspects of the present disclosure.

FIG. 5 illustrates an example conceptual phase imbalance adjusting circuit 500 using auxiliary mixers 502, 504, according to an aspect of the present disclosure. From top to bottom, FIG. 5 illustrates an I auxiliary mixer 502, an I mixer 506, a Q mixer 508, and a Q auxiliary mixer 504. The two auxiliary mixers 502, 504 are used to combine (e.g., current combine) a partial Q output (e.g., a fraction of the gain of the signal output by the Q auxiliary mixer) with the I output and combine a partial I output with the Q output. In this example, $\frac{1}{16}$ the output of the I auxiliary mixer 502 is combined (e.g., via current summing) with the output of the Q mixer 508, and $\frac{1}{16}$ the output of the Q auxiliary mixer 504 is combined with the output of the I mixer 506. Certain aspects of the present disclosure may use any suitable portion of the outputs of the auxiliary mixers 502, 504 and are not limited to a fraction of $\frac{1}{16}$. By combining I and Q mixer outputs in this manner, duplex phase imbalance adjustment may be accomplished, as shown in the vector diagram 430 of FIG. 4D. With duplex phase imbalance adjustment, the phases of both the IP/IM and QP/QM differential signal pairs are adjusted from the solid lines 431, 432 to the dotted lines 433, 434, respectively.

Figure 6A:
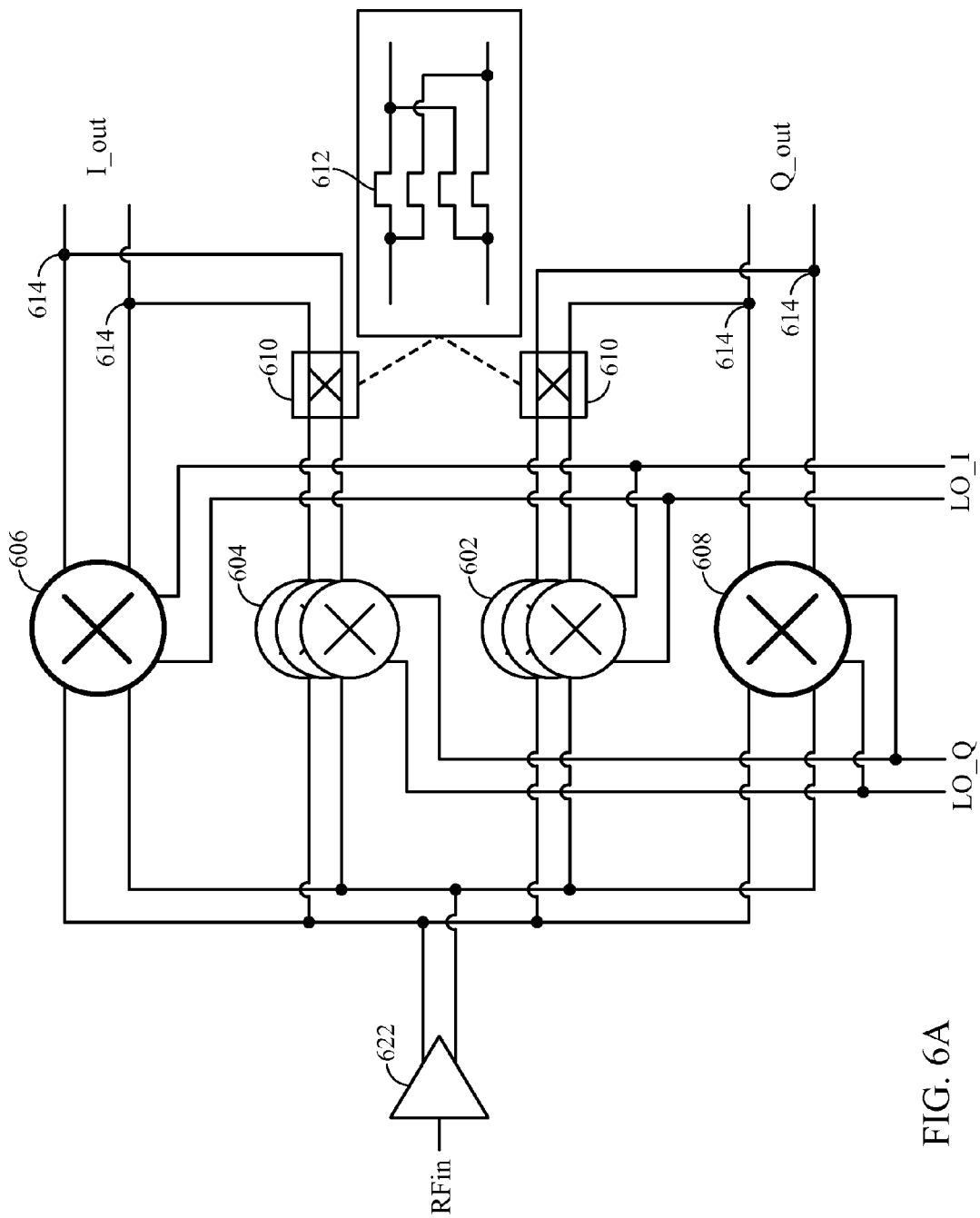
FIG. 6A is a schematic diagram of an example implementation of the phase imbalance adjusting circuit of FIG. 5, in accordance with certain aspects of the present disclosure.

FIG. 6A is a schematic diagram of an example implementation of the phase imbalance adjusting circuit 500 of FIG. 5 using differential signals, according to an aspect of the present disclosure. The normal I and Q mixers 606, 608 are illustrated by the bolded mixing stages, while the auxiliary I and Q mixers 602, 604 are represented by the thin, stacked mixing stages. The normal I and Q mixers 606, 608 and the auxiliary I and Q mixers 602, 604 may be single-balanced or double-balanced mixers. The normal I and Q mixers 606, 608 and the auxiliary I and Q mixers 602, 604 may be implemented with any mixer structure that allows for scaling the mixer output signals, such as the mixers described herein and the mixers described in U.S. Pat. No. 8,072,255 to Cicalini, filed Jan. 7, 2008 and entitled "Quadrature Radio Frequency Mixer with Low Noise and Low Conversion Loss," which is herein incorporated by reference in its entirety. Furthermore, the normal I and Q mixers 606, 608 and the auxiliary I and Q mixers 602, 604 may receive LO signals with any suitable duty cycle, such as a duty cycle that provides acceptable noise and conversion gain. For example, the mixers may be implemented with nominally 25%, nominally slightly larger than 25%, or nominally 50% duty cycle I and Q LO signals.

The "X" boxes represent polarity and/or gain control circuits 610, such that the differential outputs of the auxiliary I and Q mixers 602, 604 may be amplitude adjusted and/or phase inverted (by effectively swapping the two differential signal lines). The exploded view of the polarity and/or gain control circuits 610 illustrates example devices (e.g., switches, which may be combined with variable resistances or which may be combined or implemented with transistors 612 operated in the triode region) and connections for implementing the polarity and/or gain control. More detailed examples of the polarity and/or gain control circuits 610 are described below.

An input RF signal (RFin) may be amplified, buffered, or attenuated by a low noise amplifier (LNA) 622. The LNA 622 may be a transconductance amplifier configured to receive an input voltage and generate an output current. The LNA 622 may output a single-ended signal or differential signals. If the output of the LNA 622 is a differential signal as depicted in FIG. 6A, the normal I and Q mixers 606, 608 and the auxiliary I and Q mixers 602, 604 may most likely be double-balanced mixers. If the output of the LNA 622 is a single-ended signal, however, the normal and auxiliary I and Q mixers may most likely be single-balanced mixers.

The output signal from the LNA 622 may be mixed by the normal I mixer 606 with an in-phase LO (LO_I) to produce an output in-phase signal (I_out) having frequency components at the sum and difference of the two signals input to the normal I mixer 606. Similarly, the output signal from the LNA 622 may also be mixed by the normal Q mixer 608 with a quadrature LO (LO_Q, which is 90° out of phase with LO_I) to produce an output quadrature signal (Q_out) having frequency components at the sum and difference of the two signals input to the normal Q mixer 608. Furthermore, the auxiliary I mixer 602 may mix the output signal from the LNA 622 with the LO_I, and the output mixed signal is combined with the output of the normal Q mixer 608 to form Q_out. For certain aspects, a polarity and/or gain control circuit 610 may be used to invert and/or attenuate the output signal from the auxiliary I mixer 602 before combining with the output of the normal Q mixer 608. Likewise, the auxiliary Q mixer 604 may mix the output signal from the LNA 622 with the LO_Q, and this output mixed signal is combined with the output of the normal I mixer 606 to form I_out. For certain aspects, a polarity and/or gain control circuit 610 may be used to invert and/or attenuate the output signal from the auxiliary Q mixer 604 before combining with the output of the normal I mixer 606. In this manner, the auxiliary mixers 602, 604 may be used to accomplish duplex phase imbalance adjustment as illustrated in FIG. 4D. For certain aspects, the combining of signals from the normal and auxiliary mixers may occur at summing nodes 614 for current summing the respective signals.

Figure 6B:
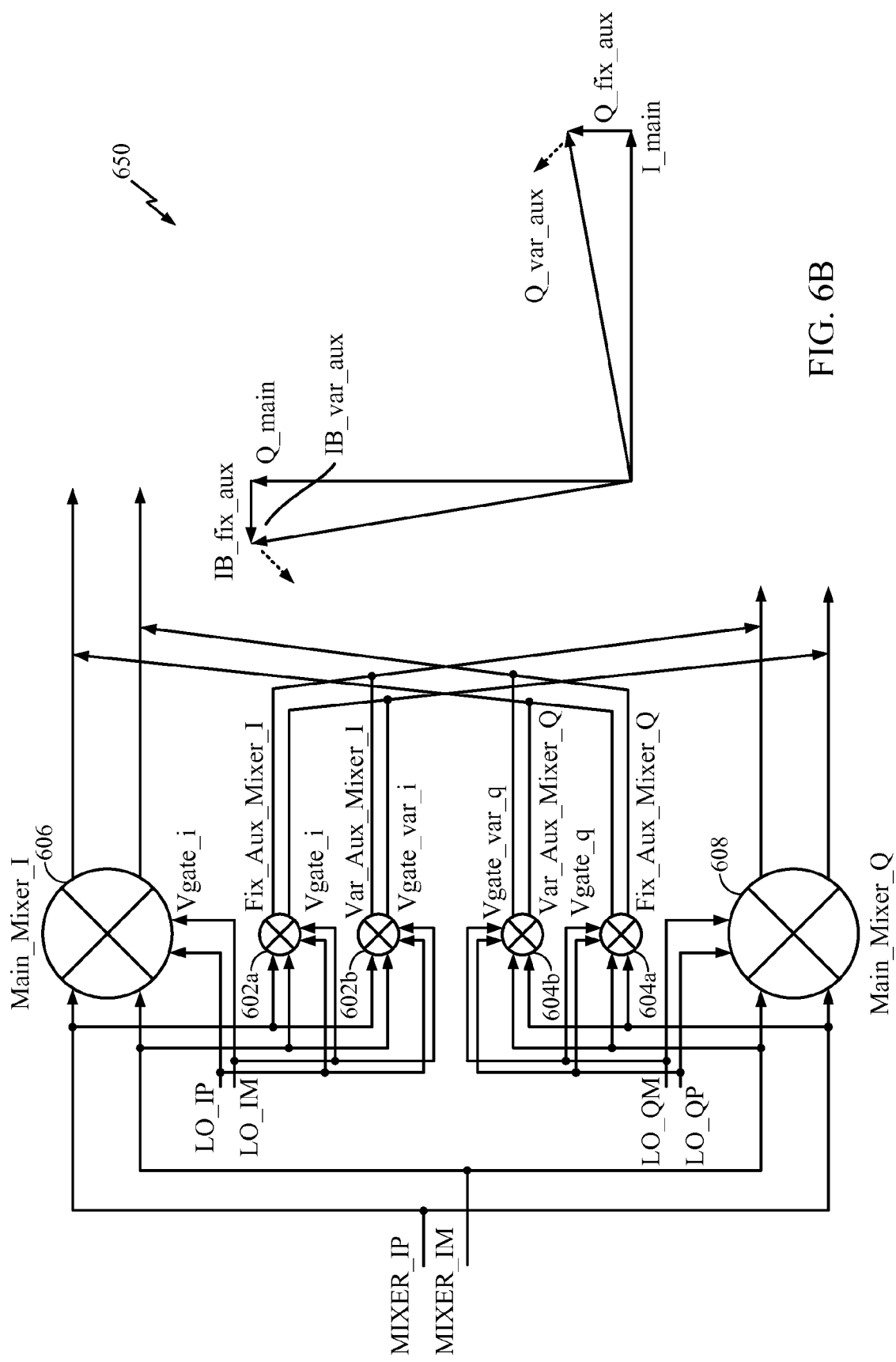
FIG. 6B is a schematic diagram of an example implementation of the phase imbalance adjusting circuit of FIG. 6A having fixed and variable auxiliary mixers along with a simplified illustration of one example effect of the adjustment, in accordance with certain aspects of the present disclosure.

For certain aspects, the auxiliary mixers 602, 604 shown in FIG. 6A may comprise fixed and variable auxiliary mixers, as illustrated in FIG. 6B. The fixed auxiliary I and Q mixers 602a, 604a may add a constant phase shift to the Q and I baseband signals (e.g., Q_out and I_out), respectively, generated by the normal Q and I mixers 608, 606. In contrast, the variable auxiliary I and Q mixers 602b, 604b are adjustable, such that the RSB may be corrected (or at least reduced) by varying the gate voltages of transistors in the variable mixers. The fixed auxiliary mixers 602a, 604a have the effect of rotating the phase of the entire I_main and Q_main axis by the same amount. This is illustrated in the simplified two-vector diagram 650 in FIG. 6B. The phase shift of IB_fix_aux is equal to the shift of Q_fix_aux and rotates the entire constellation (here, the Q_main vector and the I_main vector) counterclockwise. It should be understood that the magnitude and angular direction of the phase shift of IB_fix_aux and Q_fix_aux are not limited by FIG. 6B. In contrast with the fixed components (IB_fix_aux and Q_fix_aux), the variable components (IB_var_aux and Q_var_aux) may be independently controlled and may rotate the I_main and Q_main vectors different amounts to correct (or at least reduce) phase imbalances. The simplified phasor example in FIG. 6B depicts IB_var_aux and Q_var_aux adding to IB_fix_aux and Q_fix_aux, consistent with the mixer output connections in the corresponding circuit of FIG. 6B. However, IB_var_aux and Q_var_aux may be adjusted in either angular direction with the addition of polarity controls to the variable auxiliary I and Q mixers 602b, 604b. It should be understood that the magnitude of adjustment from IB_var_aux and Q_var_aux is not limited by FIG. 6B and may be set to correct the offsets in the I_main and Q_main signal paths absent the adjustment circuits. FIG. 4D is a more complete example vector representation of the correction possible with the circuit of FIG. 6B.

Figure 7:
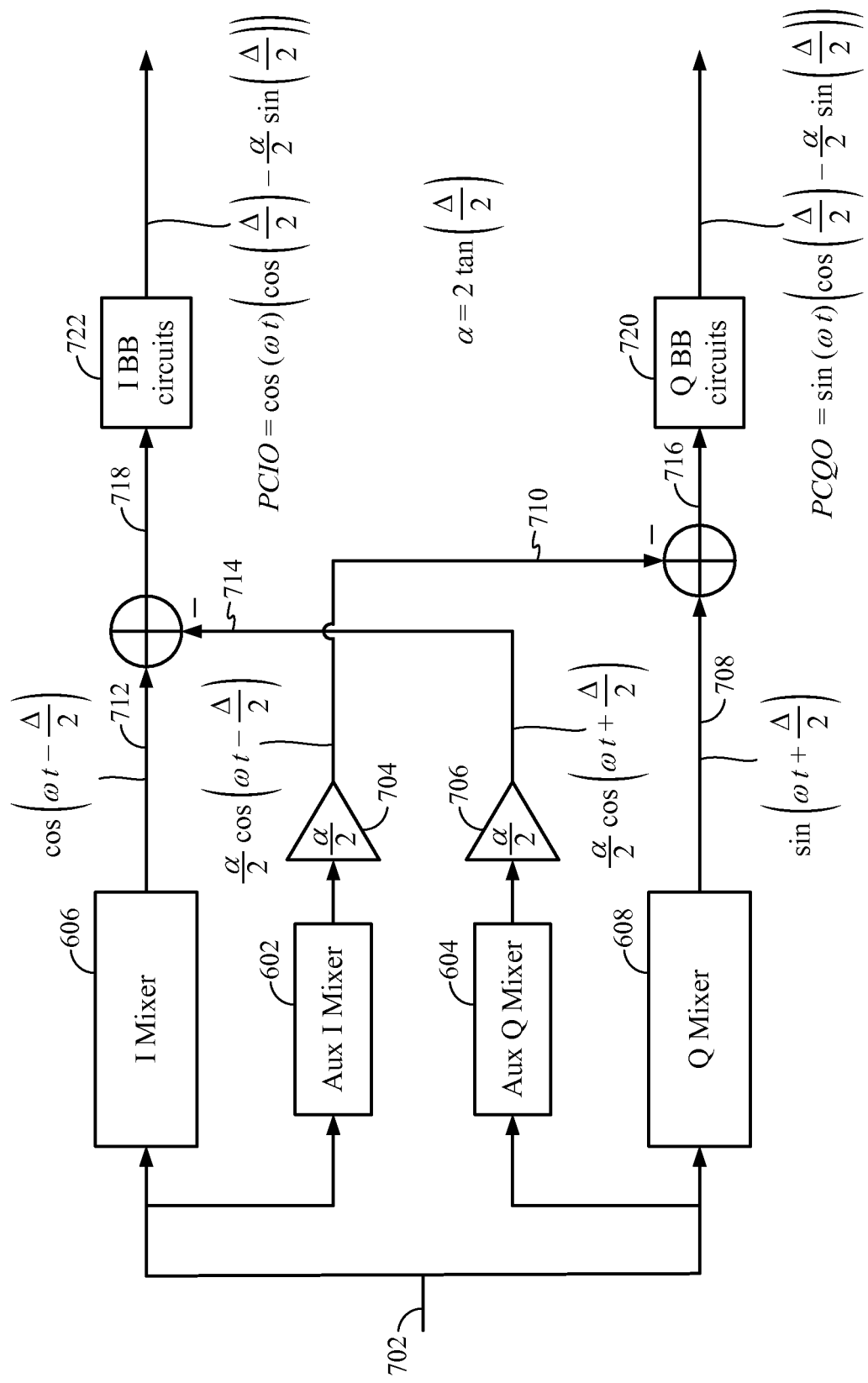
FIG. 7 is a block diagram with signal equations of an example phase imbalance adjusting circuit using auxiliary mixers, in accordance with certain aspects of the present disclosure.

FIG. 7 is a block diagram conceptually illustrating the phase imbalance adjusting using auxiliary mixers and presenting associated signal equations, according to an aspect of the present disclosure. An RF signal 702 may be provided as input to an I mixer 606 and to a Q mixer 608. In the auxiliary branches, the amplitude ($\alpha/2$) of the signal may be a fraction that of the normal mixers' outputs. In other words, the auxiliary mixers 602, 604 (or more specifically, the gain control circuits 704, 706 implemented in or connected with the auxiliary mixers) may output a partial signal to combine with the output from another mixer. For example, as illustrated, an output 708 from the Q mixer 608 may be combined (e.g., summed) with the partial output 710 from the auxiliary I mixer 602, and an output 712 from the I mixer 606 may be combined with the partial output 714 from the auxiliary Q mixer 604. These signal combinations 716, 718 may be processed in the Q and I baseband (BB) circuits 720, 722 (e.g., BB filters), respectively, thereby leading to the phase-corrected in-phase output (PCIO) and phase-corrected quadrature output (PCQO) signals with associated equations as shown in FIG. 7.

Figure 8:
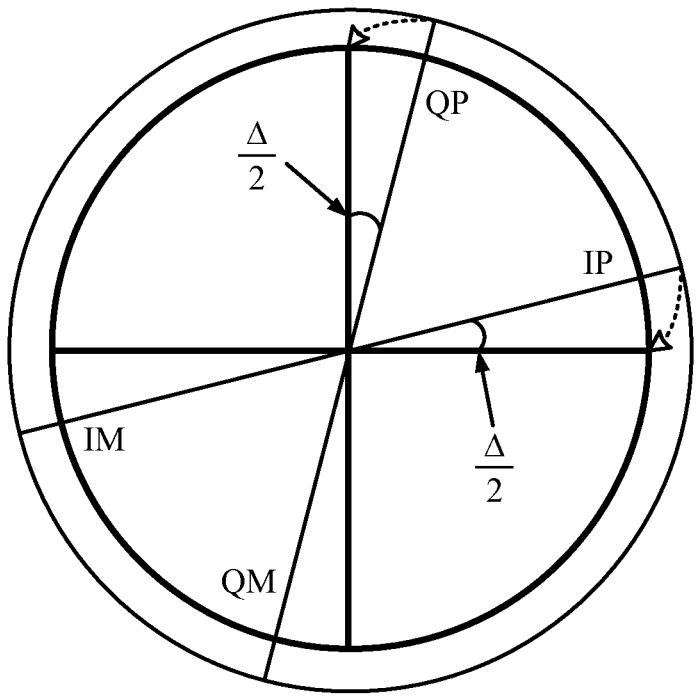
FIG. 8 illustrates an example duplex phase correction with associated phase-corrected signal equations corresponding to the implementation in FIG. 6A, in accordance with certain aspects of the present disclosure.

FIG. 8 illustrates an example of duplex I/Q phase imbalance adjustment corresponding to the implementation in FIG. 6A, according to an aspect of the present disclosure. PCIO represents a phase-corrected I output, and PCQO represents a phase-corrected Q output, according to the equations shown in FIG. 8. This duplex phase imbalance adjustment may entail a minimal or no amplitude change. If $\Delta$ (a combination of the mixer and LO I and Q phase imbalance and the baseband input-referred phase imbalance) is a small enough value, the value of $\cos(\Delta/2)$ may be 1. There may be amplitude drops due to $\alpha = 2\tan(\Delta/2)$ as illustrated.

Figure 9:
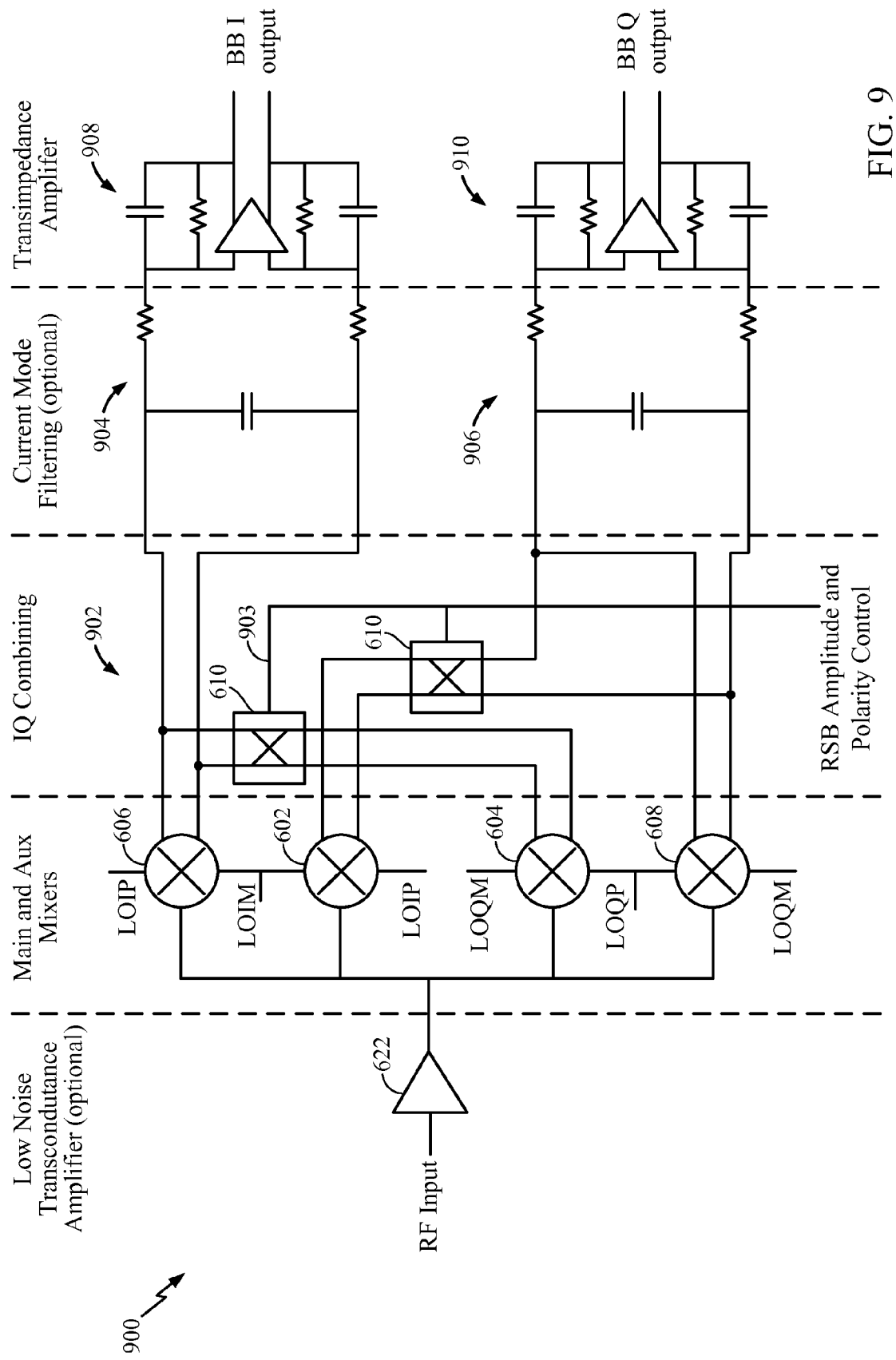
FIG. 9 is a schematic diagram of an example radio frequency front end (RFFE) with a phase imbalance adjusting circuit using auxiliary mixers, in accordance with certain aspects of the present disclosure.

FIG. 9 is a schematic diagram of an example RF front end (RFFE) 900 with a phase imbalance adjusting circuit using auxiliary mixers 602, 604, according to an aspect of the present disclosure. A low noise transconductance amplifier 622 may precede the main and auxiliary mixers and may be used to amplify an RF input. The main and auxiliary mixers may be single balanced mixers or double balanced mixers. The mixer output may be provided to an I-Q combining circuit 902, where the X boxes represent polarity and/or gain control circuits 610 as described above. One or more control lines 903 may be connected with the polarity and/or gain control circuits 610 to control the components therein (e.g., adjust the on-resistance of a transistor 612, modify the resistance of a variable resistor (e.g., a rheostat), or control operation of a switch). Optionally, current mode filters 904, 906 (e.g., baseband filters) may be used to filter the baseband signals output by the mixers 602, 604, 606, 608 and the I-Q combining circuit 902. The current mode filters 904, 906 may be implemented with any suitable combination of resistors, capacitors, and inductors for baseband (low-pass) filtering. The mixed (and optionally filtered) signals may be provided to transimpedance amplifiers 908, 910 to convert the current-mode baseband signals to voltage-mode baseband I and Q signals for additional baseband processing.

Phase Adjustment by Partial Combining of Quadrature Mixer Outputs

Figure 10:
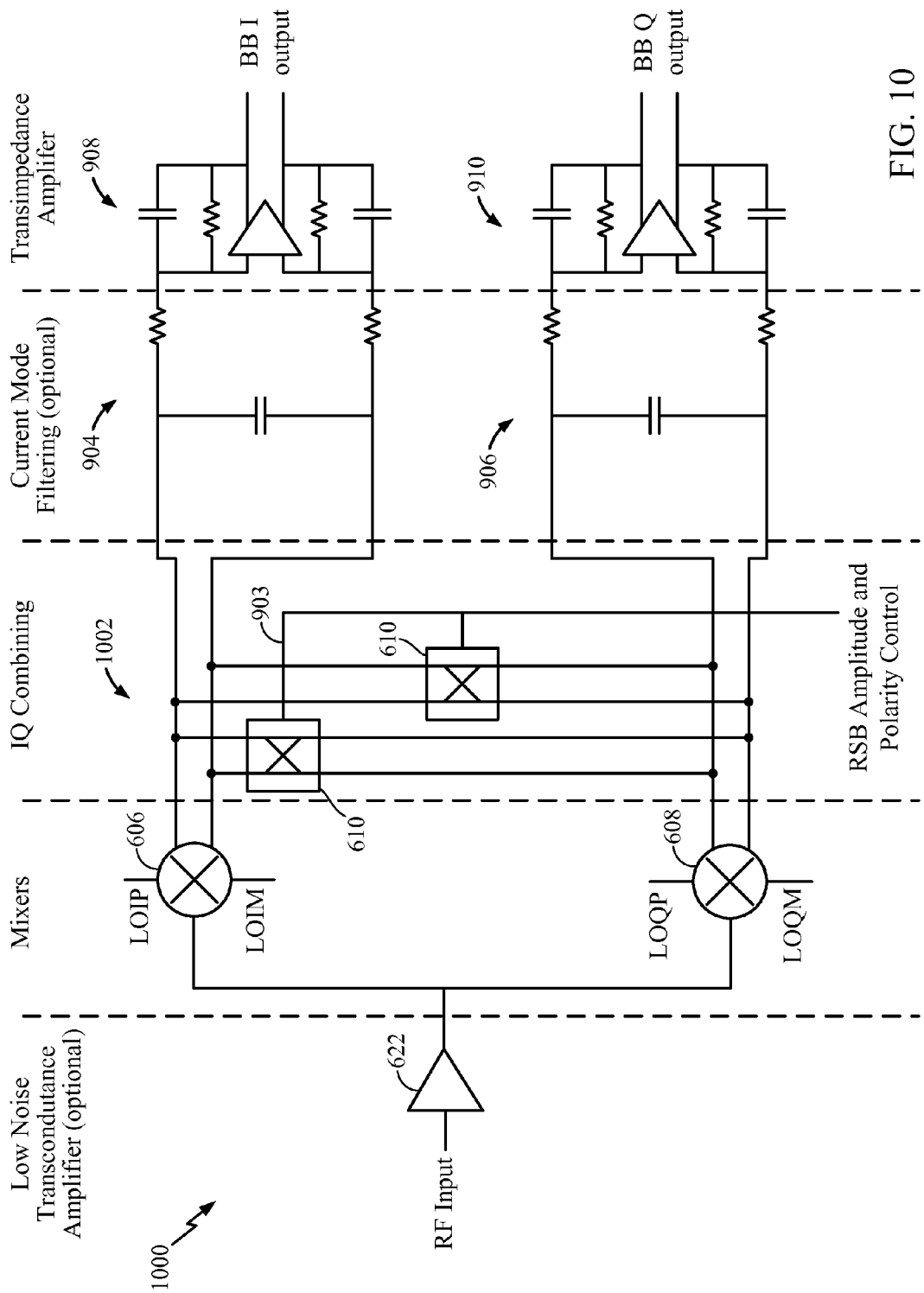
FIG. 10 is a schematic diagram of an example RFFE with a phase imbalance adjusting circuit using partial combining of mixer output quadrature signals, in accordance with certain aspects of the present disclosure.

FIG. 10 is a schematic diagram of an example RFFE 1000 with a phase imbalance adjusting circuit using partial combining of quadrature mixer output signals (e.g., without the auxiliary mixers 602, 604 described above), according to an aspect of the present disclosure. The functions of the main and auxiliary mixers may be effectively combined in FIG. 10, such that the normal I and Q mixers 606, 608 receive an RF input, which may be amplified by an optional low noise transconductance amplifier 622. Although a single-ended output signal from the amplifier 622 is connected with single-balanced mixers as shown in FIG. 10, the output of the amplifier 622 may be a differential signal instead, in which case double-balanced mixers may be used. The mixer outputs may be provided to an I-Q combining circuit 1002 connected as shown, where the X boxes represent polarity and/or gain control circuits 610 as described above. For certain aspects, one or the other of the polarity and/or gain control circuits 610 may be included (i.e., one of the X boxes is optional). The combined baseband outputs, which may be filtered using optional current mode filters 904, 906, may be provided to transimpedance amplifiers 908, 910 to convert the current-mode signals to voltage-mode signals (e.g., baseband I and Q signals) for additional processing.

For certain aspects, a polarity and/or gain control circuit 610 may be implemented with four transistors, each drain and source of the transistors connected between a different one of the four combinations of LOIP, LOIM, LOQP, and LOQM. There may be a resistor between each mixer signal line and the drain or source of the transistor, for a total of eight series resistors.

Figure 11:
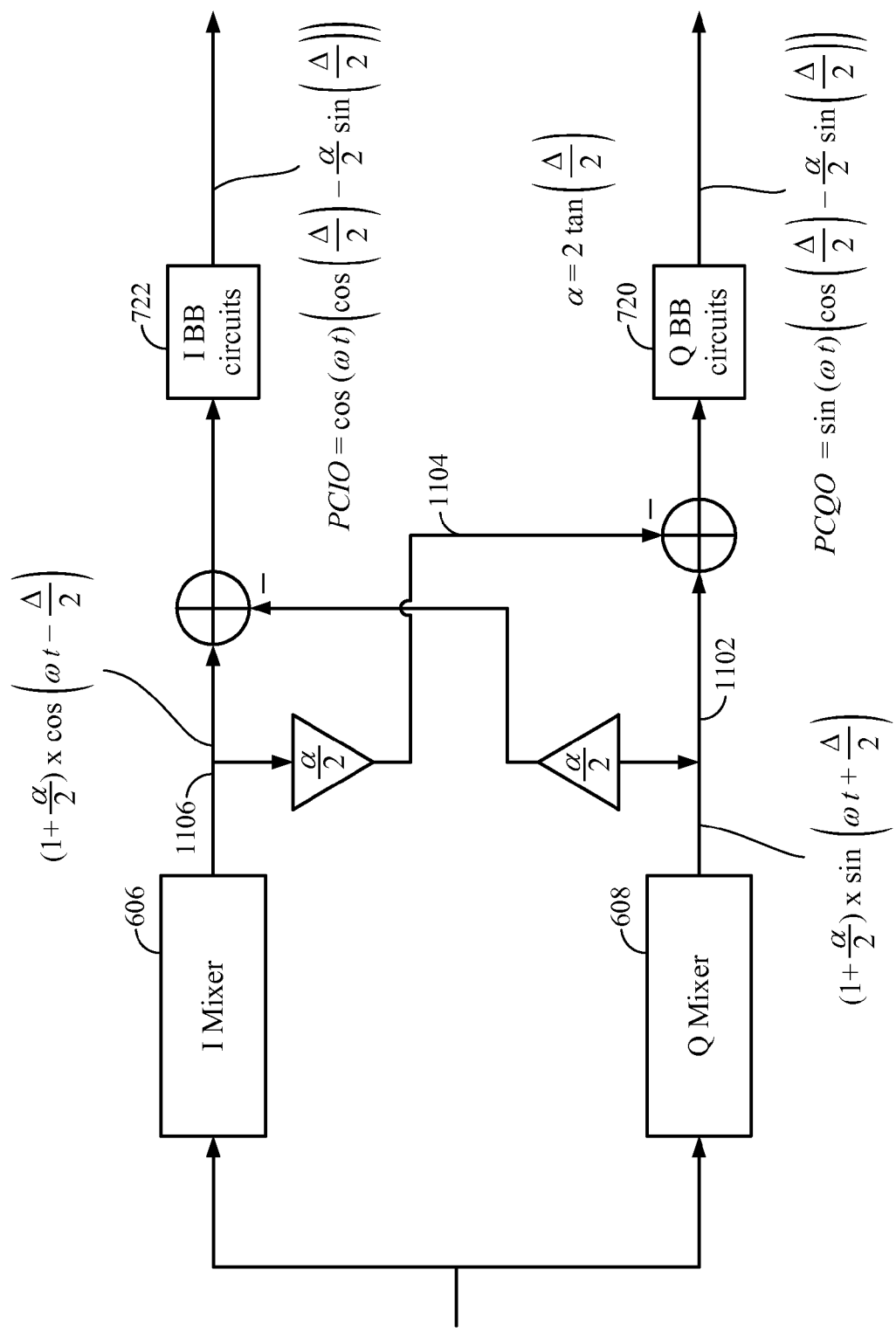
FIG. 11 is a block diagram with signal equations of an example phase imbalance adjusting circuit using partial combining of mixer output quadrature signals, in accordance with certain aspects of the present disclosure.

FIG. 11 is a block diagram conceptually illustrating the phase imbalance adjusting without using auxiliary mixers and presenting associated signal equations, according to an aspect of the present disclosure. An RF signal may be provided as input to an I mixer 606 and to a Q mixer 608. A fraction of the amplitude (a/2) of one mixer's output signal may be combined with the output signal from another mixer. For example, as illustrated, an output 1102 from the Q mixer 608 may be combined (e.g., summed) with the partial output 1104 from the I mixer 606, and an output 1106 from the I mixer 606 may be combined with the partial output 1108 from the Q mixer 608. These signal combinations lead to the PCIO and PCQO signals with associated equations as shown in FIG. 11.

Figure 12A:
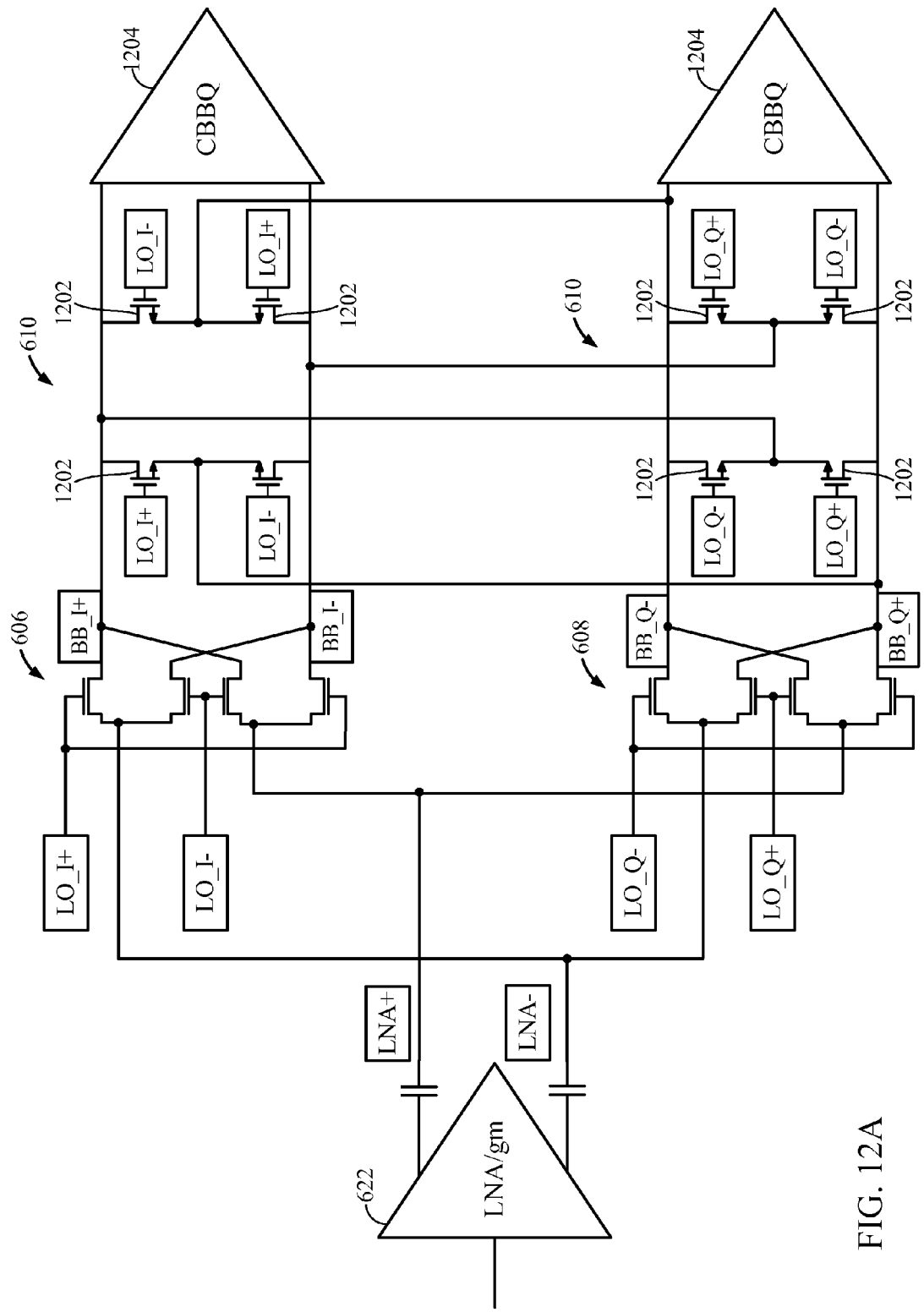
FIGS. 12A and 12B are schematic diagrams of example implementations of a phase imbalance adjusting circuit, where the local oscillator (LO) signals control the partial combining, in accordance with certain aspects of the present disclosure.
Figure 12B:
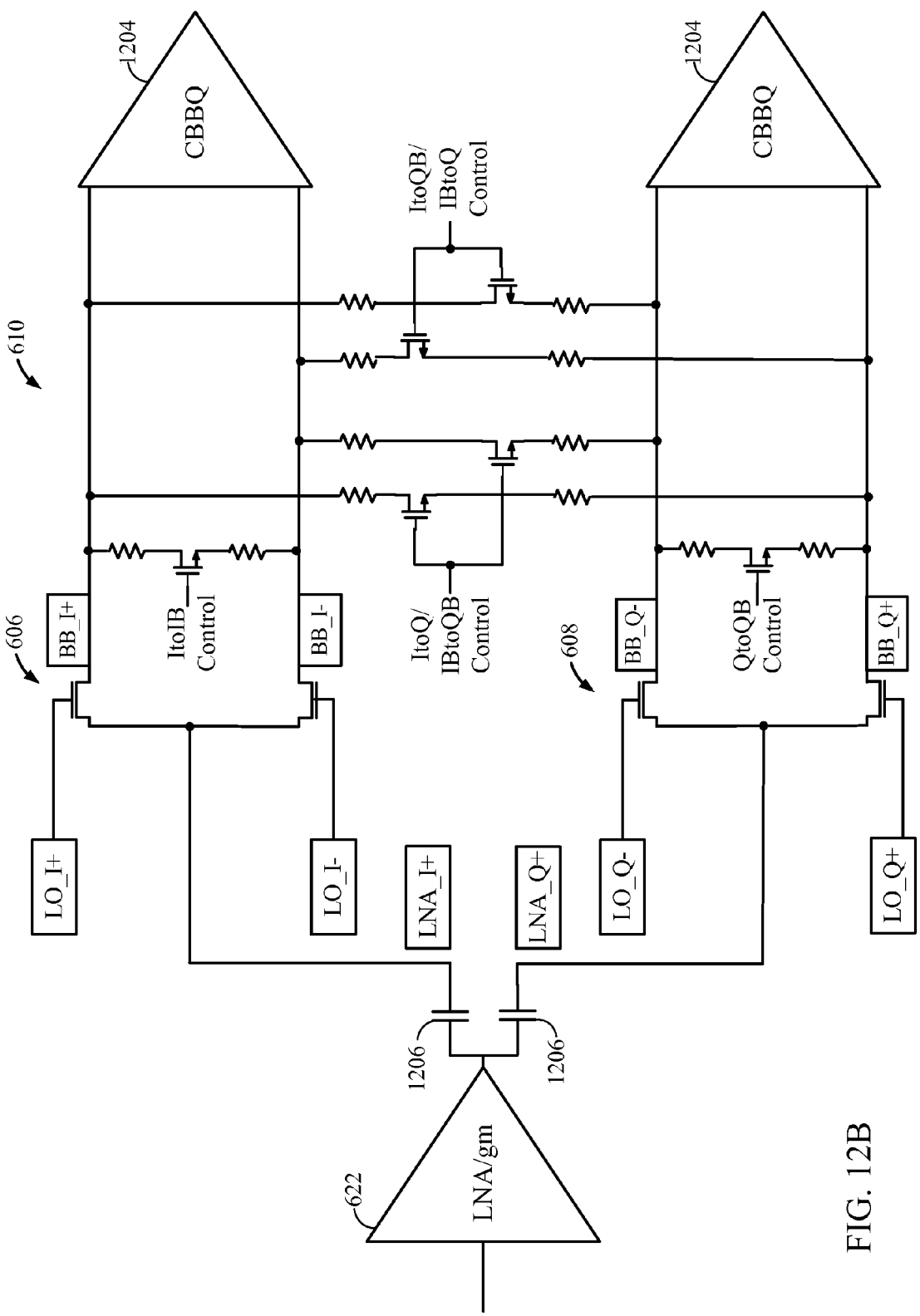

FIGS. 12A and 12B are schematic diagrams of example implementations of a phase imbalance adjusting circuit using partial combining of quadrature mixer output signals, according to aspects of the present disclosure. In FIG. 12A, double-balanced mixers are shown, and the local oscillator signals LO_I and LO_Q are connected with gates of the transistors 1202 in the polarity and/or gain control circuits 610, such that the timing of the partial combining is synchronized. For certain aspects, LO_I+ and LO_I− may be interchanged in the polarity and/or gain control circuit 610 from what is shown in FIG. 12A. Likewise, LO_Q+ and LO_Q− may also be interchanged in the other polarity and/or gain control circuit 610.

For certain aspects, interchanging the LO_I+ and LO_I− (and/or the LO_Q+ and LO_Q−) may be accomplished by placing multiplexers (i.e., muxes) between the gates of the transistors 1202 and the various differential quadrature LO signals. By employing muxes, the +/−LO connections may be swapped.

For certain aspects, the amount of the coupling (i.e., the partial combining) is may be controlled by activating more or less transistors 1202. If the number of the activated transistors 1202 is greater, the amount of the coupling increases, and vice versa. The activation of each transistor 1202 may be achieved by turning on or off the buffers in the LO driving path. If the buffers are on, the transistors 1202 may be activated, whereas if the buffers are off, the transistors may be deactivated.

The circuit in FIG. 12A also includes current buffer biquads (CBBQs) 1204, which may be baseband filters that have low impedance inputs and provide a $2^{nd}$-order baseband transfer function. For certain aspects, the CBBQs 1204 may be preceded by optional current mode filtering or may be replaced with transimpedance amplifiers with optional current mode filtering, as illustrated in FIGS. 9 and 10.

FIG. 12B is a schematic diagram of an example implementation with single-balanced mixers. In this implementation, the output of the LNA 622 may be single-ended, and AC coupling capacitors 1206 are used to couple the single-ended output of the LNA 622 to the normal I and Q mixers 606, 608. For other aspects, however, a single common capacitor may be used instead, since LNA_I+ and LNA_Q+ signals have the same amplitude and phase. At the mixer outputs, I may be coupled to Q (and IB may be coupled to QB) through the combining paths controlled by the ItoQ/IBtoQB control signal. Alternatively, I may be coupled to QB (and IB may be coupled to Q) through the combining paths controlled by the ItoQB/IBtoQ control signal. If the coupling paths are implemented as multiple sets of resistors and transistors in parallel, the strength of the coupling may be modified by controlling the number of transistors which are enabled by the control signals. Further, gain control on the I and Q mixer outputs may be provided by the ItoIB coupling path (which is controlled by the ItoIB control signal) and by the QtoQB coupling path (which is controlled by the QtoQB control signal). As with FIG. 12A, the CBBQs 1204 may be optionally preceded by optional current mode filtering or may be replaced by any combination of current mode filtering and transimpedance amplifiers (TIA), as illustrated in FIGS. 9 and 10.

Figure 13:
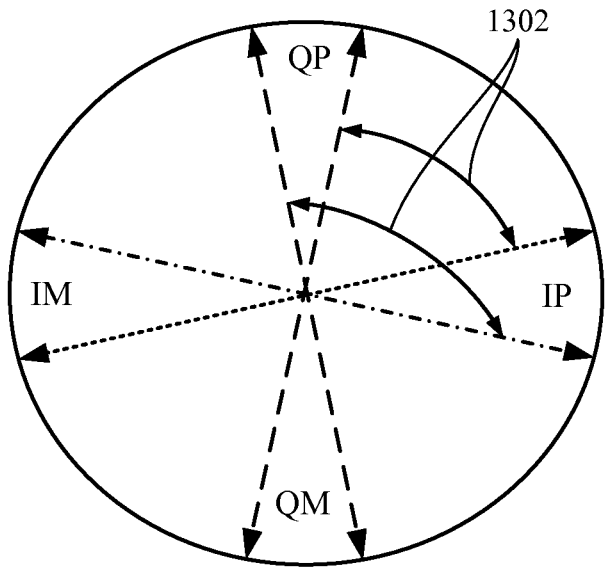
FIG. 13 illustrates an example phase correction that may be performed with the implementation in FIG. 10, in accordance with certain aspects of the present disclosure.

FIG. 13 illustrates an example of possible I-Q corrections that may be performed by a phase imbalance adjusting circuit using partial combining of quadrature mixer output signals, such as in the RFFE 1000 in FIG. 10 or implementations thereof. As shown, the angle 1302 between IP/IM and QP/QM may be increased or decreased, where I and Q are adjusted together. I and Q may not be independently controlled in this implementation, in contrast with phase imbalance adjusting circuits using auxiliary mixers, such as the RFFE 900 in FIG. 9 or implementations thereof. The corrections in FIG. 13 may be summarized by the equations $$I'=I+\alpha Q$$

and $$Q'=Q+\alpha I$$

where α is between −10% and 10% inclusive, for example. However, if partial combining of quadrature mixer output signals is implemented with time synchronization as described with respect to FIG. 12A, then independent control of coupling from Q to I and from I to Q may be possible to implement, as is the case with phase imbalance adjusting using auxiliary mixers.

Example Mixer Implementations

Figure 14:
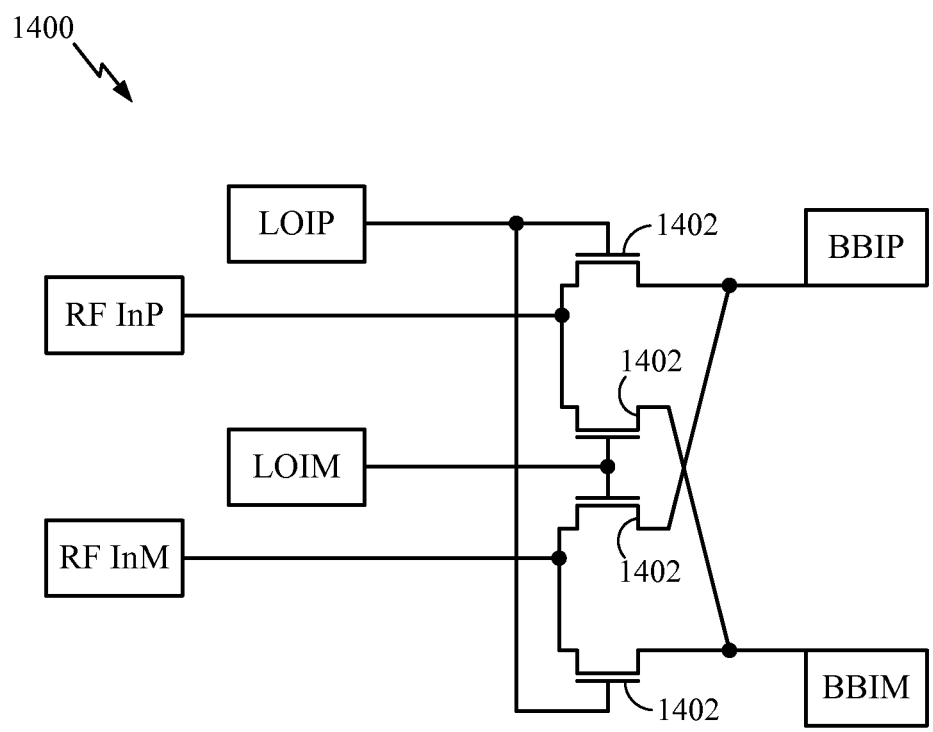
FIG. 14 illustrates an example double balanced mixer in accordance with certain aspects of the present disclosure.

FIG. 14 illustrates an example double balanced mixer 1400 that may be used as a mixer in a phase imbalance adjusting circuit, as main or auxiliary mixers, according to aspects of the present disclosure. The transistors 1402 of the mixer 1400 may mix a differential RF signal (RF InP and RF InM) with a differential LO signal (such as a differential I LO signal composed of LOIP and LOIM). The mixing produces a differential (baseband) output signal (BBIP and BBIM) having frequency components at the sum and difference frequencies of the differential RF and LO signals.

The channel width-to-length ratio (W/L) of an auxiliary mixer transistor may be smaller than the W/L of a main mixer transistor. For example, the W/L of an auxiliary mixer transistor can be between 10 and 100 times smaller than that of a main mixer transistor (e.g., W/L of 0.3 to 3 for an auxiliary mixer transistor versus 30 for a main mixer transistor). The auxiliary mixer may be designed to any suitable size to provide a desired phase imbalance correction and is not limited to the previous example.

Figure 15A:
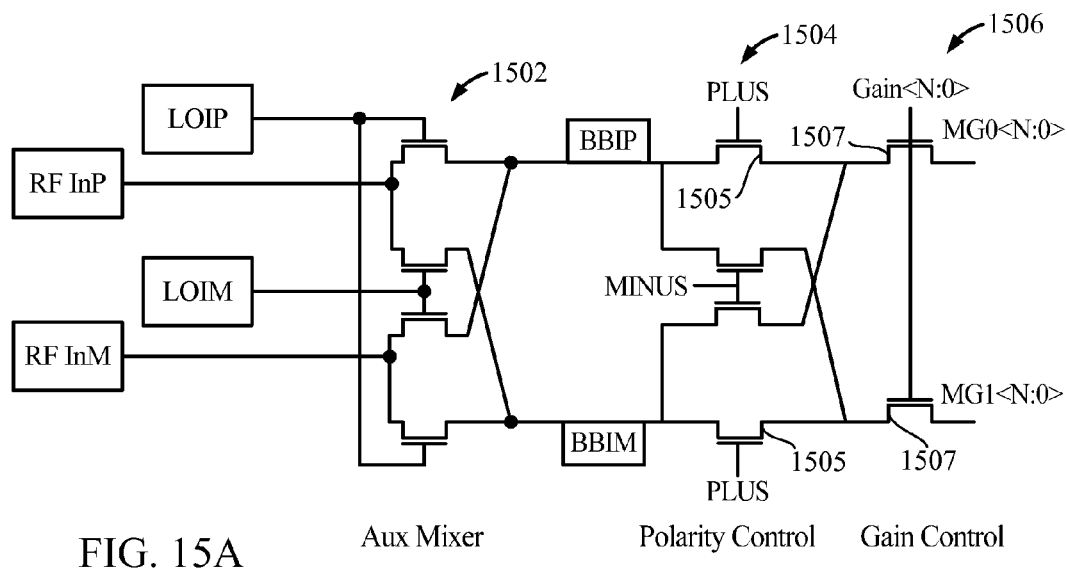
FIGS. 15A-15F illustrate an example mixer implementation with various example polarity and/or gain control circuits, in accordance with certain aspects of the present disclosure.

FIGS. 15A-15F illustrate an example mixer implementation with various example polarity and/or gain control circuits 610, according to aspects of the present disclosure. In FIG. 15A, an auxiliary mixer 1502 provides input to a polarity control circuit 1504 (composed of four transistors 1505) and a digital gain control circuit 1506. The effective auxiliary mixer gain (i.e., the overall gain through the auxiliary mixer and the polarity and/or gain control circuit) may be controlled, for example, by (digitally) controlling the number N of transistors 1507 in parallel that are enabled. The order of the polarity and gain control circuits 1504, 1506 is interchangeable.

Figure 15B:
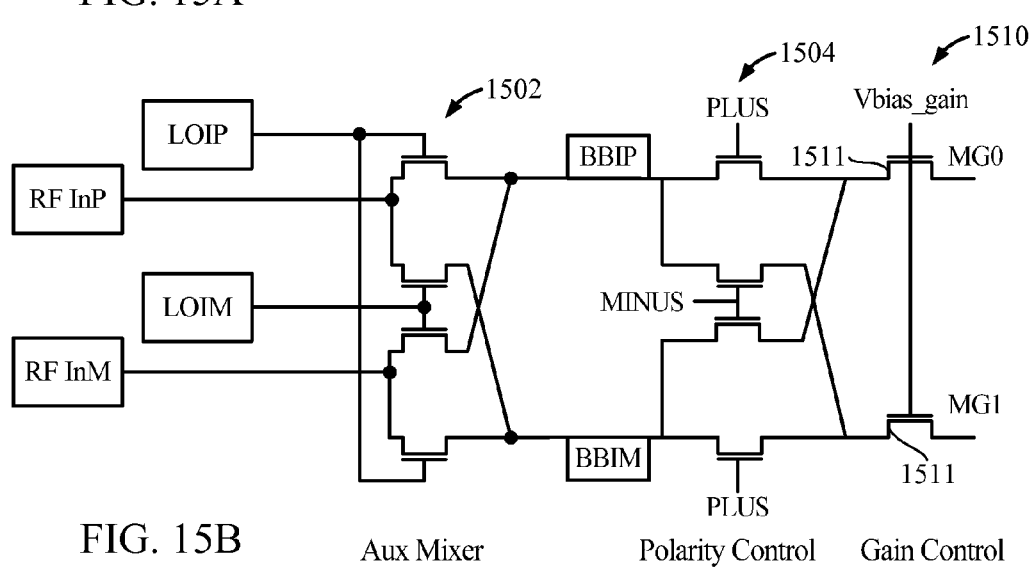

FIG. 15B illustrates an auxiliary mixer 1502 providing input to a polarity control circuit 1504 and an analog gain control circuit 1510, in contrast with the digital gain control circuit 1506 of FIG. 15A. The effective auxiliary mixer gain may be controlled, for example, by controlling the gate bias on gain control transistors 1511, which may control the $RA_{ds(on)}$ of the gain control transistors. The order of the polarity and gain control circuits 1504, 1510 is interchangeable. For certain aspects, the digital gain control circuit 1506 may be cascaded with the analog gain control circuit 1510, in either order.

Figure 15C:
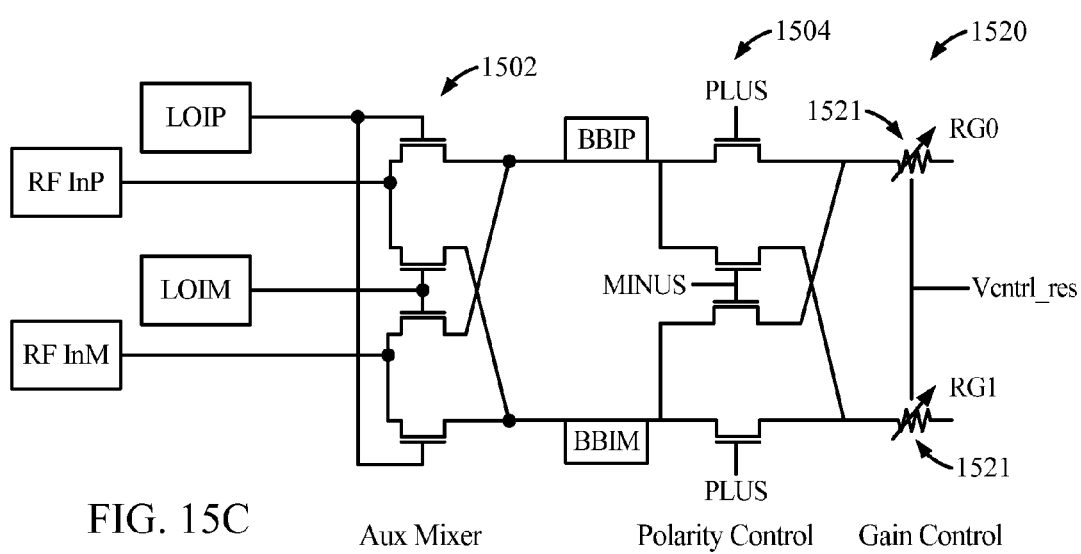

FIG. 15C illustrates an example circuit similar to FIG. 15B, with variable resistors 1521 used in place of the gain control transistors 1511 in the gain control circuit 1520. The variable resistance may be analog or digitally controlled via a control line Vcntrl_res, for example.

Figures 15D, 15E:
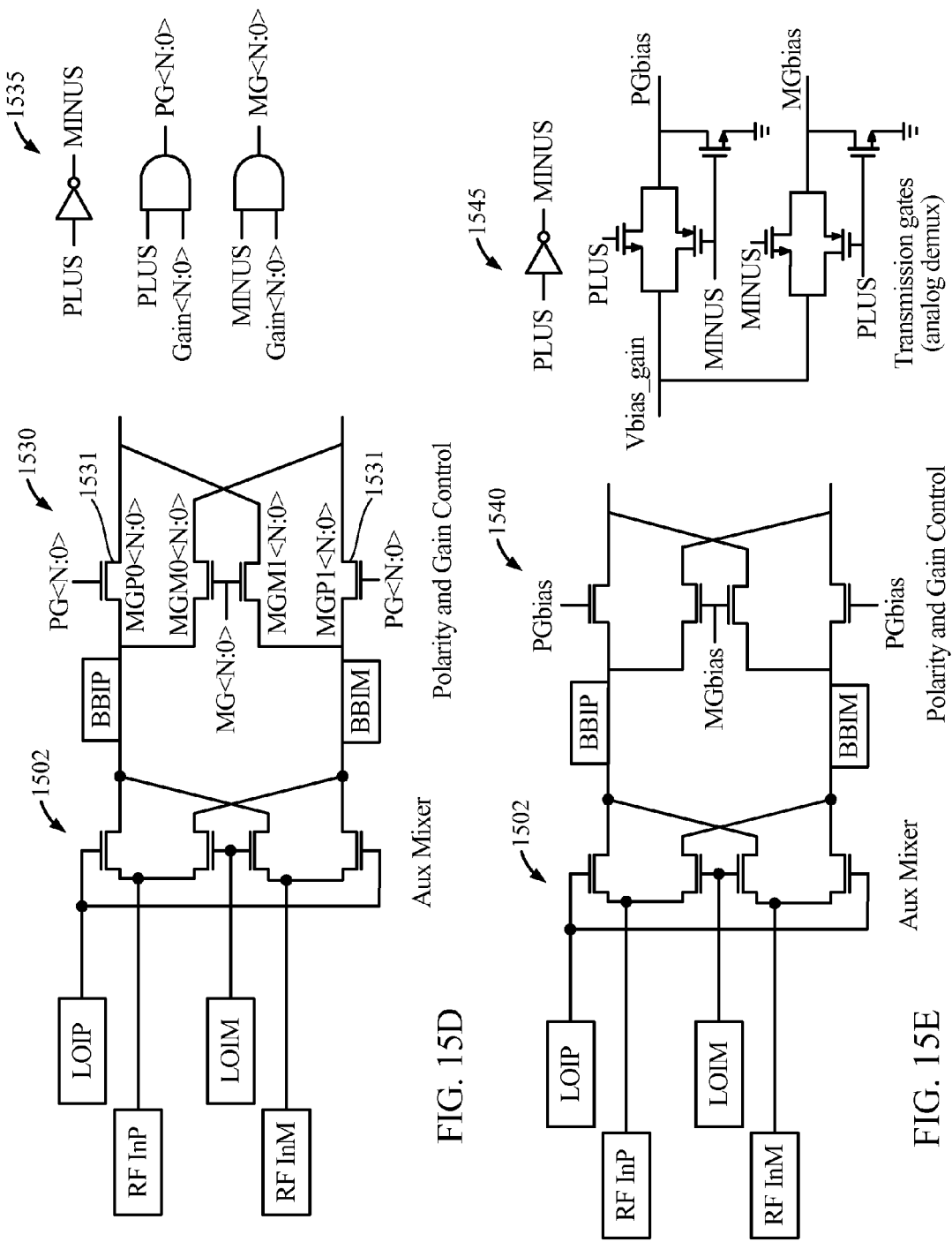

For certain aspects, polarity and gain controls may be merged. For example, FIG. 15D illustrates an example circuit 1530 similar to FIG. 15A, with polarity and gain control merged into four groups of selectively enabled parallel transistors 1531 connected with the auxiliary mixer 1502. Digital control lines may be used to select various combinations of the N transistors in each group. Digital logic (e.g., logic gates 1535) may also be used to effectively control the polarity and/or gain of the circuit 1530.

FIG. 15E illustrates an example circuit 1540 similar to that shown in FIG. 15B, but with polarity and gain control merged into four transistors 1541. For certain aspects, transmission gates 1545 (e.g., an inverter and an analog demultiplexer) may be used to create the bias signals for controlling the polarity and/or the gain.

Figure 15F:
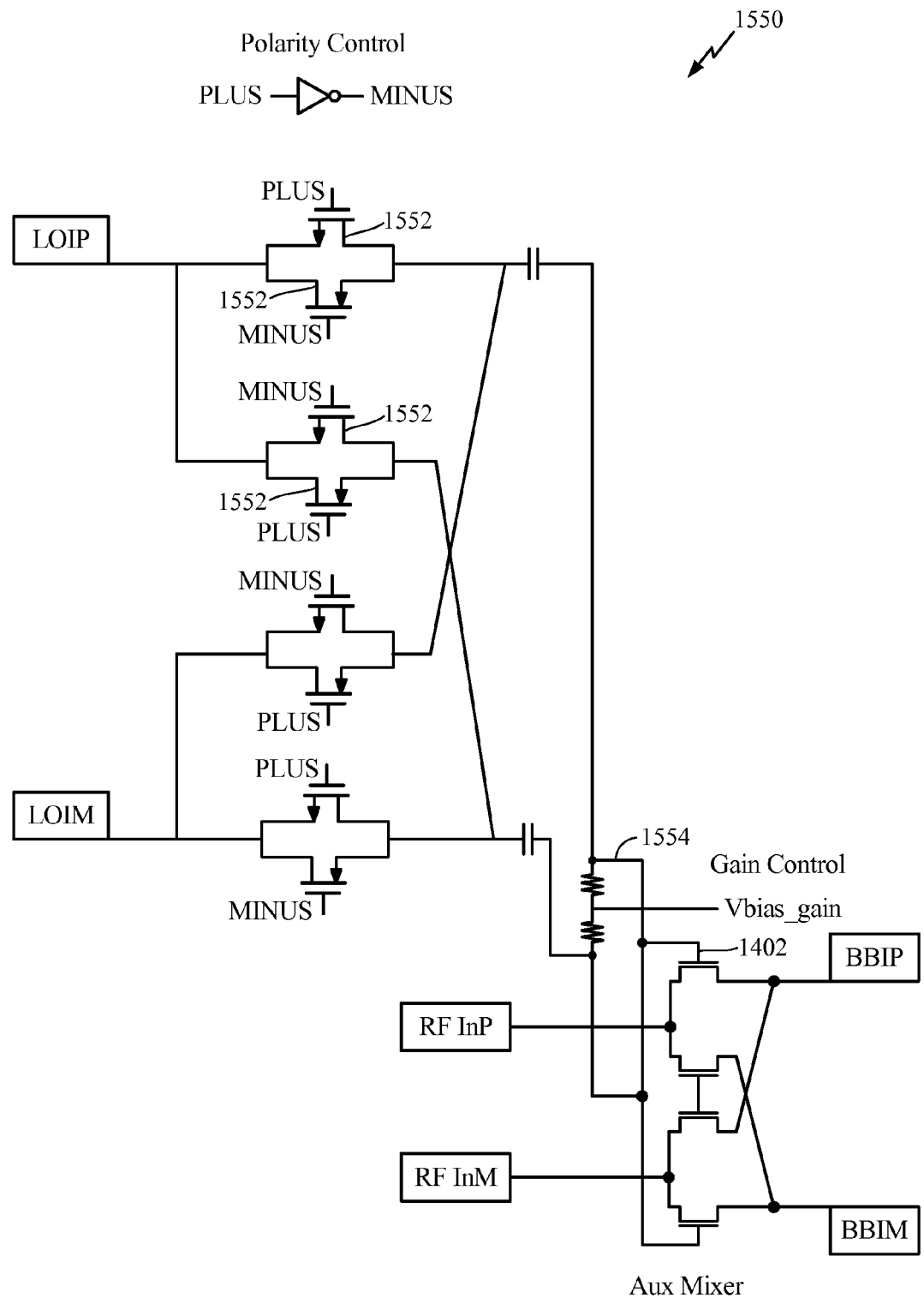

FIG. 15F illustrates an example circuit 1550 that may be used to implement the variable auxiliary mixers 602b, 604b of FIG. 6B. The polarity here is controlled by selectively swapping the LO signal polarity (using switches or transistors 1552 controlled by the PLUS and MINUS signals), and the gain is controlled by controlling the DC bias 1554 on the gates of the auxiliary mixer transistors 1402 using the control line Vbias_gain.

Figure 16:
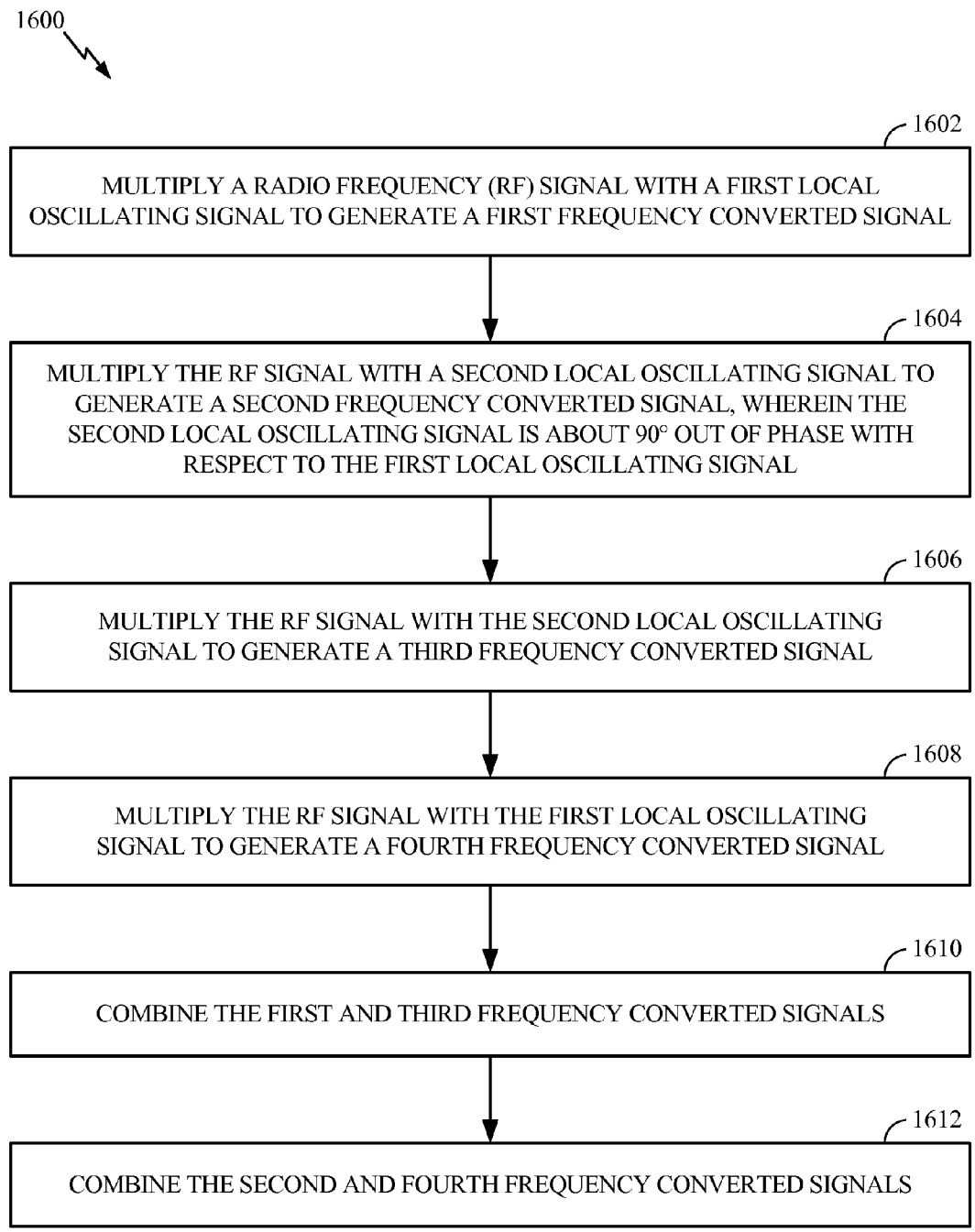
FIGS. 16 and 17 are flow diagrams of example operations for quadrature combining and adjusting in an effort to correct a phase imbalance, in accordance with certain aspects of the present disclosure.

FIG. 16 illustrates example operations 1600 for quadrature combining and adjusting in an effort to correct a phase imbalance, according to certain aspects of the present disclosure. The operations 1600 may be performed by a phase imbalance adjusting circuit, such as the circuit portrayed in FIG. 6A or FIG. 9, which may be controlled by a processing system. Operations 1600 may begin at block 1602 by multiplying an RF signal with a first local oscillating signal to generate a first frequency converted signal. At block 1604, the circuit may multiply the RF signal with a second local oscillating signal to generate a second frequency converted signal. The second local oscillating signal may be about 90° out of phase with respect to the first local oscillating signal. At block 1606, the RF signal is multiplied with the second local oscillating signal to generate a third frequency converted signal. At block 1608, the RF signal is multiplied with the first local oscillating signal to generate a fourth frequency converted signal. At block 1610, the first and third frequency converted signals are combined. At block 1612, the second and fourth frequency converted signals are combined.

According to certain aspects, the operations 1600 may further involve scaling the third frequency converted signal to have an amplitude that is a fraction of the first frequency converted signal before combining the first and third frequency converted signals at block 1610 and scaling the fourth frequency converted signal to have an amplitude that is a fraction of the second frequency converted signal before combining the second and fourth frequency converted signals at block 1612. The scaling of at least one of the third or fourth frequency converted signal may be programmable. For certain aspects, the operations 1600 may further include inverting a phase of the at least one of the third or fourth frequency converted signal. This phase inversion may be programmable.

According to certain aspects, combining the first and third frequency converted signals at block 1610 and combining the second and fourth frequency converted signals at block 1612 may involve current summing the respective signals at summing nodes.

According to certain aspects, the multiplying to generate at least one of the third or fourth frequency converted signal at block 1606 and/or block 1608 is programmable.

According to certain aspects, the first and second local oscillating signals and the first, second, third, and fourth frequency converted signals are differential signals. The RF signal may be a differential or a single-ended signal.

According to certain aspects, the operations 1600 may further include receiving the RF signal from a transconductance amplifier.

According to certain aspects, a phase imbalance between at least one of the first and second local oscillating signals or the first and second mixing circuits has been corrected at a combination of the first and third frequency converted signals and at a combination of the second and fourth frequency converted signals.

According to certain aspects, the operations 1600 may further include processing a combination of the first and third frequency converted signals in a first baseband circuit and processing a combination of the second and fourth frequency converted signals in a second baseband circuit. In this case, an amplitude imbalance and a phase imbalance between the first and second baseband circuits may have been corrected or at least adjusted at the combination of the first and third frequency converted signals and at the combination of the second and fourth frequency converted signals.

Figure 17:
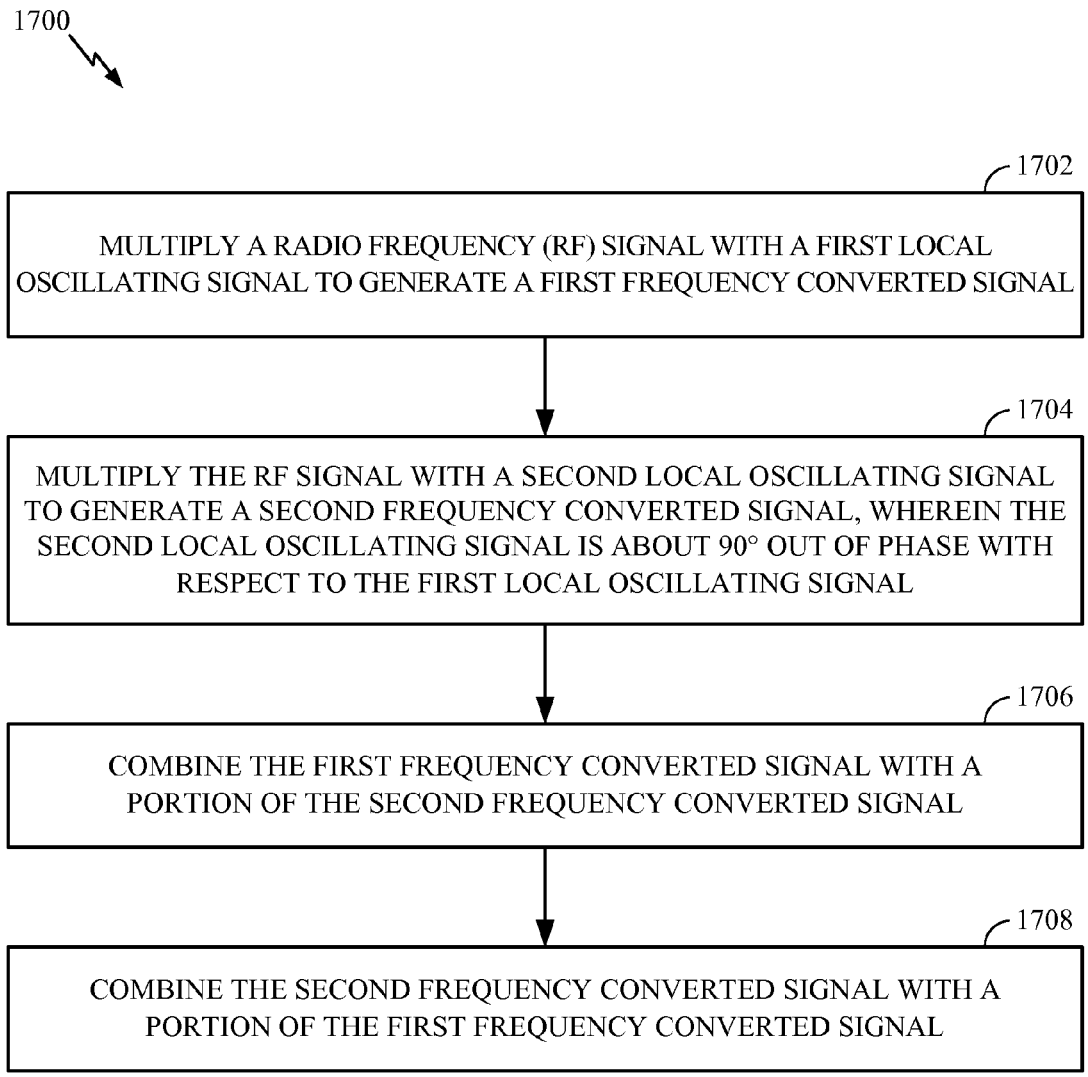

FIG. 17 illustrates example operations 1700 for quadrature combining and adjusting in an effort to correct a phase imbalance, in accordance with certain aspects of the present disclosure. The operations 1700 may be performed by a phase imbalance adjusting circuit, such as the circuit depicted in FIG. 10, which may be controlled by a processing system. Operations 1700 may begin at block 1702, where a radio frequency (RF) signal may be multiplied with a first local oscillating signal (e.g., an LO_I signal) to generate a first frequency converted signal (e.g., an I_out signal). At block 1704, the RF signal may be multiplied with a second local oscillating signal (e.g., an LO_Q signal) to generate a second frequency converted signal (e.g., a Q_out signal), wherein the second local oscillating signal is about 90° out of phase with respect to the first local oscillating signal. At block 1706, the first frequency converted signal may be combined with a portion of the second frequency converted signal. At block 1708, the second frequency converted signal may be combined with a portion of the first frequency converted signal.

According to certain aspects, the operations 1700 may further involve at least one of: (1) scaling the portion of the second frequency converted signal to have an amplitude that is a fraction of the first frequency converted signal before combining the first frequency converted signal with the portion of the second frequency converted signal at block 1706; or (2) scaling the portion of the first frequency converted signal to have an amplitude that is a fraction of the second frequency converted signal before combining the second frequency converted signal with the portion of the first frequency converted signal at block 1708. For certain aspects, scaling at least one of the portion of the first or second frequency converted signal is programmable. The operations 1700 may also include inverting a phase of at least one of the portion of the first or second frequency converted signal. This phase inversion may be programmable. For certain aspects, scaling at least one of the portion of the first or second frequency converted signal is selectively enabled by at least one of the first or second local oscillating signal (e.g., as shown in FIG. 12A).

According to certain aspects, combining the first frequency converted signal and the portion of the second frequency signal at block 1706 and combining the second frequency converted signal and the portion of the first frequency signal at block 1708 may involve current summing the respective signals at summing nodes.

According to certain aspects, the multiplying to generate at least one of the first or second frequency converted signal at block 1702 and/or block 1704 is programmable.

According to certain aspects, the first and second local oscillating signals and the first and second frequency converted signals are differential signals. The RF signal may be differential or single-ended.

According to certain aspects, the operations 1700 may further involve receiving the RF signal from a transconductance amplifier.

According to certain aspects, a phase imbalance between at least one of the first and second local oscillating signals or the first and second mixing circuits has been corrected or at least adjusted at a combination of the first frequency converted signal and the portion of the second frequency converted signal and at a combination of the second frequency converted signal and the portion of the first frequency converted signal.

According to certain aspects, the operations 1700 may further involve processing a combination of the first frequency converted signal and the portion of the second frequency converted signal in a first baseband circuit and processing a combination of the second frequency converted signal and the portion of the first frequency converted signal in a second baseband circuit. In this manner, a phase imbalance between the first and second baseband circuits may have been corrected or at least adjusted at the combination of the first and the portion of the second frequency converted signals and at the combination of the second and the portion of the first frequency converted signals.

CONCLUSION

Certain aspects of the present disclosure generally relate to quadrature combining and adjusting in RF circuits, with or without the use of auxiliary mixers. Using these techniques, the mixer I/Q phase imbalance, the LO I/Q phase imbalance, and/or the BB I/Q phase imbalance in the RF circuits may be corrected, or at least adjusted.

The various operations or methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for receiving may comprise a receiver (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for processing or means for determining may comprise a processing system, which may include one or more processors, such as the RX data processor 270, the TX data processor 288, and/or the controller 280 of the user terminal 120 illustrated in FIG. 2. Means for multiplying may include a mixing circuit, such as the I mixer 606, the Q mixer 608, the I auxiliary mixer 602, the Q auxiliary mixer 604, the mixer 1400, or the auxiliary mixer 1502. Means for combining may include a current summing node, such as summing nodes 614 illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A circuit for frequency converting and quadrature combining, comprising:
   a first mixing circuit configured to multiply a radio frequency (RF) signal with a first local oscillating signal to generate a first frequency converted signal;
   a second mixing circuit configured to multiply the RF signal with a second local oscillating signal to generate a second frequency converted signal, wherein the second local oscillating signal is about 90° out of phase with respect to the first local oscillating signal;
   a third mixing circuit configured to multiply the RF signal with the second local oscillating signal to generate a third frequency converted signal;
   a fourth mixing circuit configured to multiply the RF signal with the first local oscillating signal to generate a fourth frequency converted signal;
   a first combining circuit configured to combine the first frequency converted signal with the third frequency converted signal;
   a second combining circuit configured to combine the second frequency converted signal with the fourth frequency converted signal;
   a first scaling circuit interposed between the third mixing circuit and the first combining circuit and configured to scale the third frequency converted signal to have an amplitude that is a fraction of the first frequency converted signal; and
   a second scaling circuit interposed between the fourth mixing circuit and the second combining circuit and configured to scale the fourth frequency converted signal to have an amplitude that is a fraction of the second frequency converted signal.

2. The circuit of claim 1, wherein a gain of at least one of the first or second scaling circuit is programmable.

3. The circuit of claim 1, wherein at least one of the first or second scaling circuit is configured to invert a phase of the third or fourth frequency converted signal, respectively.

4. The circuit of claim 3, wherein the phase inversion of the at least one of the first or second scaling circuit is programmable.

5. The circuit of claim 1, wherein the first and second combining circuits comprise summing nodes for current summing respective signals.

6. The circuit of claim 1, wherein at least one of the third and fourth mixing circuits are programmable.

7. The circuit of claim 1, wherein a phase imbalance between at least one of the first and second local oscillating signals or the first and second mixing circuits has been corrected at outputs of the first and second combining circuits.

8. The circuit of claim 1, further comprising:
   a first baseband circuit for processing a combination of the first and third frequency converted signals; and
   a second baseband circuit for processing a combination of the second and fourth frequency converted signals, wherein a phase imbalance between the first and second baseband circuits has been corrected or at least adjusted at outputs of the first and second combining circuits.

9. A method for frequency converting and quadrature combining, comprising:
  multiplying a radio frequency (RF) signal with a first local oscillating signal to generate a first frequency converted signal;
  multiplying the RF signal with a second local oscillating signal to generate a second frequency converted signal, wherein the second local oscillating signal is about 90° out of phase with respect to the first local oscillating signal;
  multiplying the RF signal with the second local oscillating signal to generate a third frequency converted signal;
  multiplying the RF signal with the first local oscillating signal to generate a fourth frequency converted signal;
  combining the first and third frequency converted signals;
  combining the second and fourth frequency converted signals;
  scaling the third frequency converted signal to have an amplitude that is a fraction of the first frequency converted signal before combining the first and third frequency converted signals; and
  scaling the fourth frequency converted signal to have an amplitude that is a fraction of the second frequency converted signal before combining the second and fourth frequency converted signals.

10. The method of claim 9, further comprising inverting a phase of the at least one of the third or fourth frequency converted signal.

11. The method of claim 9, wherein combining the first and third frequency converted signals and combining the second and fourth frequency converted signals comprise current summing respective signals at summing nodes.

12. The method of claim 9, wherein a phase imbalance between at least one of the first and second local oscillating signals or the first and second mixing circuits has been corrected at a combination of the first and third frequency converted signals and at a combination of the second and fourth frequency converted signals.

13. The method of claim 9, further comprising:
  processing a combination of the first and third frequency converted signals in a first baseband circuit; and
  processing a combination of the second and fourth frequency converted signals in a second baseband circuit, wherein a phase imbalance between the first and second baseband circuits has been corrected or at least adjusted at the combination of the first and third frequency converted signals and at the combination of the second and fourth frequency converted signals.

14. A circuit for frequency converting and quadrature combining, comprising:
  a first mixing circuit configured to multiply a radio frequency (RF) signal with a first local oscillating signal to generate a first frequency converted signal;
  a second mixing circuit configured to multiply the RF signal with a second local oscillating signal to generate a second frequency converted signal, wherein the second local oscillating signal is about 90° out of phase with respect to the first local oscillating signal;
  a first combining circuit configured to combine the first frequency converted signal with a portion of the second frequency converted signal;
  a second combining circuit configured to combine the second frequency converted signal with a portion of the first frequency converted signal; and
  at least one of:
    a first scaling circuit interposed between the second mixing circuit and the first combining circuit and configured to scale the portion of the second frequency converted signal to have an amplitude that is a fraction that of the first frequency converted signal; or
    a second scaling circuit interposed between the first mixing circuit and the second combining circuit and configured to scale the portion of the first frequency converted signal to have an amplitude that is a fraction that of the second frequency converted signal.

15. The circuit of claim 14, wherein a gain of at least one of the first or second scaling circuit is programmable.

16. The circuit of claim 14, wherein at least one of the first or second scaling circuit is configured to invert a phase of the portion of the second or first frequency converted signal, respectively and wherein the phase inversion of the at least one of the first or second scaling circuit is programmable.

17. The circuit of claim 14, wherein the at least one of the first or second scaling circuit is selectively enabled by at least one of the first or second local oscillating signal.

18. The circuit of claim 14, wherein the first and second combining circuits comprise summing nodes for current summing respective signals.

19. The circuit of claim 14, wherein a phase imbalance between at least one of the first and second local oscillating signals or the first and second mixing circuits has been corrected or at least adjusted at outputs of the first and second combining circuits.

20. The circuit of claim 14, further comprising:
  a first baseband circuit configured to process a combination of the first frequency converted signal and the portion of the second frequency converted signal; and
  a second baseband circuit configured to process a combination of the second frequency converted signal and the portion of the first frequency converted signal, wherein a phase imbalance between the first and second baseband circuits has been corrected or at least adjusted at the combination of the first and the portion of the second frequency converted signals and at the combination of the second and the portion of the first frequency converted signals.

21. A method for frequency converting and quadrature combining, comprising:
  multiplying a radio frequency (RF) signal with a first local oscillating signal to generate a first frequency converted signal;
  multiplying the RF signal with a second local oscillating signal to generate a second frequency converted signal, wherein the second local oscillating signal is about 90° out of phase with respect to the first local oscillating signal;
  combining the first frequency converted signal with a portion of the second frequency converted signal;
  combining the second frequency converted signal with a portion of the first frequency converted signal; and
  at least one of:
    scaling the portion of the second frequency converted signal to have an amplitude that is a fraction of the first frequency converted signal before combining the first frequency converted signal with the portion of the second frequency converted signal; or
    scaling the portion of the first frequency converted signal to have an amplitude that is a fraction of the second frequency converted signal before combining the second frequency converted signal with the portion of the first frequency converted signal.

22. The method of claim 21, further comprising inverting a phase of at least one of the portion of the first or second frequency converted signal.

23. The method of claim 21, wherein scaling at least one of the portion of the first or second frequency converted signal is selectively enabled by at least one of the first or second local oscillating signal.

24. The method of claim 21, wherein combining the first frequency converted signal and the portion of the second frequency signal and combining the second frequency converted signal and the portion of the first frequency signal comprise current summing respective signals at summing nodes.

25. The method of claim 21, wherein a phase imbalance between at least one of the first and second local oscillating signals or the first and second mixing circuits has been corrected or at least adjusted at a combination of the first frequency converted signal and the portion of the second frequency converted signal and at a combination of the second frequency converted signal and the portion of the first frequency converted signal.

26. The method of claim 21, further comprising:
processing a combination of the first frequency converted signal and the portion of the second frequency converted signal in a first baseband circuit; and
processing a combination of the second frequency converted signal and the portion of the first frequency converted signal in a second baseband circuit, wherein a phase imbalance between the first and second baseband circuits has been corrected or at least adjusted at the combination of the first and the portion of the second frequency converted signals and at the combination of the second and the portion of the first frequency converted signals.

27. A circuit for frequency converting and quadrature combining, comprising:
a first mixing circuit configured to multiply a radio frequency (RF) signal with a first local oscillating signal to generate a first frequency converted signal;
a second mixing circuit configured to multiply the RF signal with a second local oscillating signal to generate a second frequency converted signal, wherein the second local oscillating signal is about 90° out of phase with respect to the first local oscillating signal;
a third mixing circuit configured to:
multiply the RF signal with the second local oscillating signal to generate a third frequency converted signal; and
scale an amplitude of the third frequency converted signal;
a fourth mixing circuit configured to:
multiply the RF signal with the first local oscillating signal to generate a fourth frequency converted signal; and
scale an amplitude of the fourth frequency converted signal;
a first combining circuit configured to combine the first frequency converted signal with the scaled third frequency converted signal from the third mixing circuit, thereby adjusting a phase of the first frequency converted signal; and
a second combining circuit configured to combine the second frequency converted signal with the scaled fourth frequency converted signal from the fourth mixing circuit, thereby adjusting a phase of the second frequency converted signal.

28. The circuit of claim 27, wherein the third mixing circuit is configured to scale the amplitude of the third frequency converted signal to be a fraction that of the first frequency converted signal and wherein the fourth mixing circuit is configured to scale the amplitude of the fourth frequency converted signal to be a fraction that of the second frequency converted signal.

29. The circuit of claim 27, wherein a gain of at least one of the third or fourth mixing circuit is programmable.

30. The circuit of claim 27, wherein at least one of the third or fourth mixing circuit is configured to invert a phase of the third or fourth frequency converted signal, respectively.

31. The circuit of claim 30, wherein the phase inversion of the at least one of the third or fourth mixing circuit is programmable.

32. The circuit of claim 1, wherein at least one of the first local oscillating signal or the second local oscillating signal has a nominal duty cycle of twenty-five percent.

33. The method of claim 9, wherein at least one of the first local oscillating signal or the second local oscillating signal has a nominal duty cycle of twenty-five percent.

34. The circuit of claim 14, wherein at least one of the first local oscillating signal or the second local oscillating signal has a nominal duty cycle of twenty-five percent.

35. The method of claim 21, wherein at least one of the first local oscillating signal or the second local oscillating signal has a nominal duty cycle of twenty-five percent.

36. The circuit of claim 27, wherein at least one of the first local oscillating signal or the second local oscillating signal has a nominal duty cycle of twenty-five percent.

* * * * *